US008489162B1

(12) United States Patent
Dou et al.

(10) Patent No.: US 8,489,162 B1
(45) Date of Patent: Jul. 16, 2013

(54) SLOT ANTENNA WITHIN EXISTING DEVICE COMPONENT

(75) Inventors: Weiping Dou, San Jose, CA (US); James Samuel Bowen, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 71 days.

(21) Appl. No.: 12/858,335

(22) Filed: Aug. 17, 2010

(51) Int. Cl.
*H04M 1/00* (2006.01)

(52) U.S. Cl.
USPC ..................... 455/575.7; 455/562.1; 455/129; 343/771; 343/746

(58) Field of Classification Search
USPC ............ 455/562.1, 575.5, 575.7, 575.8, 90.3, 455/129, 269; 343/702, 746, 767–771
See application file for complete search history.

(56) References Cited

U.S. PATENT DOCUMENTS 4,197,544 A * 4/1980 Kaloi ..................... 343/700 MS
5,646,634 A * 7/1997 Bokhari et al. ........ 343/700 MS
5,847,682 A * 12/1998 Ke ................................ 343/752
6,130,647 A * 10/2000 Zurcher et al. ................ 343/767
6,211,825 B1 * 4/2001 Deng ..................... 343/700 MS
6,366,243 B1 * 4/2002 Isohatala et al. ....... 343/700 MS
6,518,931 B1 * 2/2003 Sievenpiper .................. 343/770
6,590,545 B2 * 7/2003 McCorkle ..................... 343/830
6,741,214 B1 * 5/2004 Kadambi et al. ....... 343/700 MS
6,856,294 B2 * 2/2005 Kadambi et al. .............. 343/702
6,980,154 B2 * 12/2005 Vance et al. ........... 343/700 MS
7,292,196 B2 * 11/2007 Waterhouse .................. 343/770
7,342,553 B2 * 3/2008 Soler Castany et al. ...... 343/853
7,391,383 B2 * 6/2008 Schantz ........................ 343/767
7,460,074 B2 * 12/2008 Ying et al. .................... 343/702
7,486,242 B2 * 2/2009 Gala Gala et al. ............ 343/702
7,696,942 B2 * 4/2010 Kim et al. ..................... 343/767
7,746,286 B2 * 6/2010 Suzuki .......................... 343/833
7,768,462 B2 * 8/2010 Zhang et al. .................. 343/702
8,054,231 B2 * 11/2011 Ahn et al. ..................... 343/702
2001/0015703 A1 * 8/2001 Nieminen ..................... 343/768
2002/0171592 A1 * 11/2002 Mikkola et al. ............... 343/702
2003/0076268 A1 * 4/2003 Tarvas et al. .................. 343/702
2004/0058723 A1 * 3/2004 Mikkola et al. ............ 455/575.7
2004/0108957 A1 * 6/2004 Umehara et al. ....... 343/700 MS
2005/0168389 A1 * 8/2005 Yuanzhu et al. .............. 343/767
2005/0206573 A1 * 9/2005 Iigusa et al. .................. 343/770
2006/0028388 A1 * 2/2006 Schantz ........................ 343/770
2006/0055606 A1 * 3/2006 Boyle ........................... 343/702
2006/0066495 A1 * 3/2006 Isoifovich et al. ............ 343/770
2007/0171140 A1 * 7/2007 Minard et al. ................ 343/770
2007/0236401 A1 * 10/2007 Yeh et al. ...................... 343/767
2007/0257851 A1 * 11/2007 Balzovsky et al. ........... 343/726
2008/0001837 A1 * 1/2008 Liu .............................. 343/767
2008/0024378 A1 * 1/2008 Kanno et al. .................. 343/770
2008/0079644 A1 * 4/2008 Cheng ........................... 343/769
2008/0136724 A1 * 6/2008 Tavassoli Hozouri ........ 343/770
2008/0150818 A1 * 6/2008 Louzir et al. .................. 343/767
2008/0198081 A1 * 8/2008 Neto et al. .................... 343/767
2008/0198082 A1 * 8/2008 Soler Castany et al. ...... 343/770
2008/0231522 A1 * 9/2008 Montgomery et al. ....... 343/702
2008/0238792 A1 * 10/2008 Heinrich et al. .............. 343/767
2008/0284671 A1 * 11/2008 Kanno .......................... 343/767
2009/0002248 A1 * 1/2009 Zhao et al. .................... 343/722
2009/0033577 A1 * 2/2009 Kim et al. ..................... 343/767

(Continued)

*Primary Examiner* — Edward Urban
*Assistant Examiner* — Rui Hu
(74) *Attorney, Agent, or Firm* — Lowenstein Sandler LLP

(57) ABSTRACT

A user device having a slot antenna formed in metallic material of a structural member is described.

23 Claims, 18 Drawing Sheets

U.S. PATENT DOCUMENTS

2009/0051604 A1* 2/2009 Zhang et al. .................. 343/702
2009/0153407 A1* 6/2009 Zhang et al. .................. 343/702
2009/0153410 A1* 6/2009 Chiang et al. ................. 343/702
2009/0231215 A1* 9/2009 Taura ............................ 343/702
2009/0256758 A1* 10/2009 Schlub et al. ................. 343/702
2009/0256759 A1* 10/2009 Hill et al. ...................... 343/702
2009/0262028 A1* 10/2009 Mumbru et al. .............. 343/702
2009/0289858 A1* 11/2009 Olsson .......................... 343/702
2010/0123632 A1* 5/2010 Hill et al. ...................... 343/702
2010/0207829 A1* 8/2010 Parsche ......................... 343/732
2010/0231470 A1* 9/2010 Lee et al. ...................... 343/722
2010/0245049 A1* 9/2010 Yoshida et al. .............. 340/10.1
2011/0006953 A1* 1/2011 Chiang et al. ................. 343/702
2011/0050513 A1* 3/2011 Hill et al. ...................... 343/702
2011/0183721 A1* 7/2011 Hill et al. ...................... 455/566
2011/0241948 A1* 10/2011 Bevelacqua et al. .......... 343/702
2012/0013514 A1* 1/2012 Yang et al. .................... 343/746
2012/0019419 A1* 1/2012 Prat et al. ...................... 343/702
2012/0046002 A1* 2/2012 Hill et al. ........................ 455/73
2012/0092221 A1* 4/2012 Schlub et al. ................. 343/702

* cited by examiner

SLOT ANTENNA WITHIN EXISTING DEVICE COMPONENT

RELATED APPLICATIONS

This application is related to co-pending U.S. application Ser. No. 12/858,225, entitled "Antenna with an Exciter," filed Aug. 17, 2010, which is incorporated herein by reference.

BACKGROUND OF THE INVENTION

A large and growing population of users enjoy entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like. These electronic devices wirelessly communicate with a communications infrastructure to enable the consumption of the digital media items.

FIG. 1 illustrates a front side of a conventional user device 105 having a display 115. The user device 105 includes an antenna 110 disposed within a housing of the user device and above or below the display 115. The antenna 110 is typically constructed of metal and disposed on dielectric member that is disposed within the user device 105. The display 115 is typically mounted to a support member to hold the display 115 in the user device 105. The dielectric material can be disposed behind the support member of the display 115, however, the dielectric material adds to the thickness of the user device 105. In order to not add to the thickness of the conventional user device 105, the front cover 112 of user device 105 includes a space above and a space below the display 115 where the dielectric member, upon which the antenna 110 is disposed, can be housed. The space between the display 115 and the top of the user device 105 is labeled as $W_2$, and the space between the display 115 and the bottom of the user device 105 is labeled as $W_3$. By disposing the antenna 110 above or below the display 115 in $W_2$ or $W_3$, instead of on a dielectric member behind the display 115, the overall height and/or width of the user device 105 increases, or effectively reduces the size of the display 115 that can be used in the user device 105. Some conventional user devices use the space above or the space below the display to dispose other mechanical components of the user device, such as a speaker, a mechanical button, or the like.

In one conventional user device, the antenna 110 is a slot antenna formed of conductive material on the dielectric material that is disposed above, below, or behind the display. Conductive material can be disposed on the dielectric material, and a portion of the conductive material can be removed to form a slot opening (also referred to as holes, apertures, or slot cut outs). Alternatively, the slot antenna may be constructed as a conductive trace on a printed circuit board, the slot opening being formed by the conductive trace. The printed circuit board is disposed above, below, or behind the display. Slot antennas typically operate at frequencies between 300 MHz and 24 GHz, and have radiation patterns that are roughly omnidirectional. The slot antennas, having single slot openings, however, are typically considered to have a narrow bandwidth due to the discontinuities of the current flow within the limited space of the slot opening. Since single slot antennas typically have a narrow bandwidth, single slot antennas may not be suitable for some wireless network applications, such as 3G applications.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Figure 1:
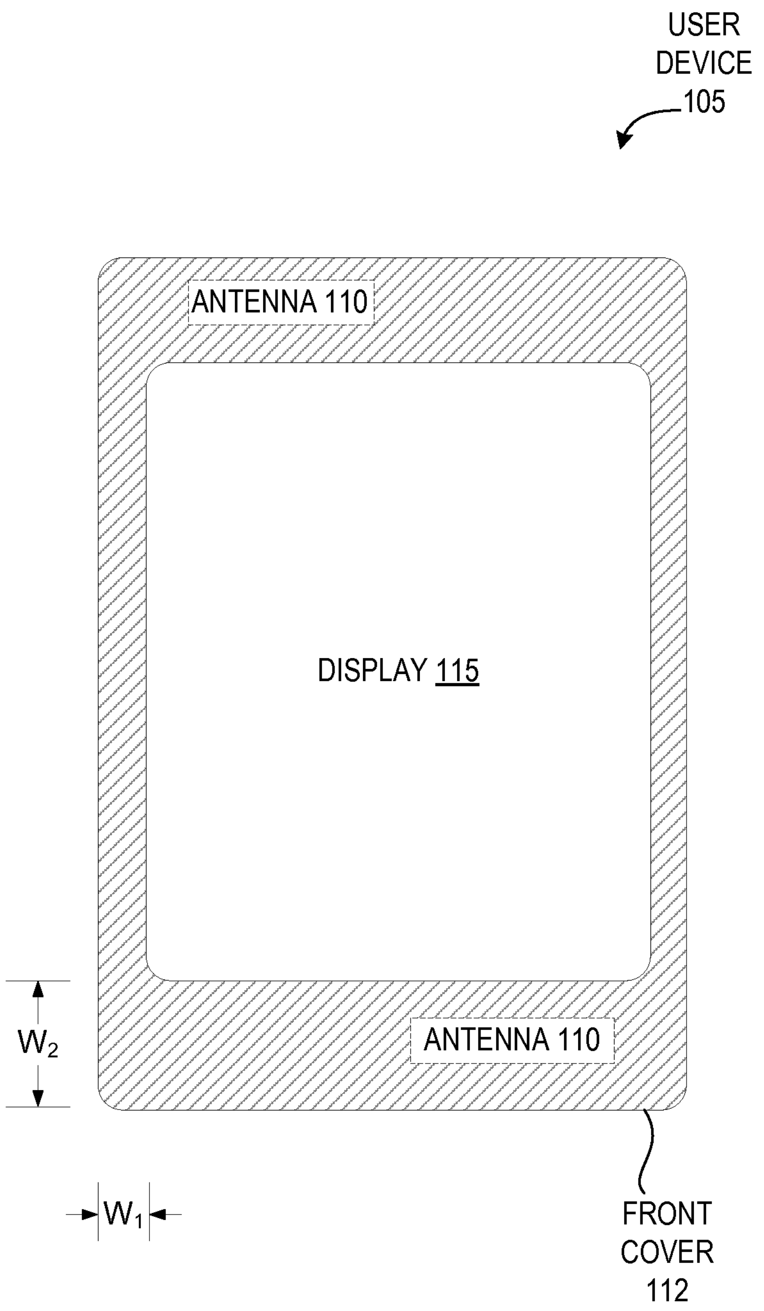
FIG. 1 illustrates a front side of a conventional user device having a display.

A user device having a multi-band aperture antenna formed in metallic material of a structural member is described. In addition, a user device having a non-radiating exciter operatively coupled to feed an antenna is described. The user device may be any content rendering device that includes a wireless modem for connecting the user device to a network. Examples of such user devices include electronic book readers, cellular telephones, personal digital assistants (PDAs), portable media players, tablet computers, netbooks, and the like.

In one embodiment, a user device includes an antenna to radiate electromagnetic energy and a non-radiating exciter operatively coupled to feed the antenna. The non-radiating exciter may be physically coupled to, or physically separated from, the antenna. In one embodiment, the antenna is a multi-band aperture antenna. The multi-band aperture antenna may be a slot antenna, a plate inverted-F antenna (PIFA), a slot loop antenna, a multi-band slot antenna, or the like. In other embodiments, other non-aperture antenna types may be used as would be appreciated by one of ordinary skill in the art having the benefit of this disclosure. The multi-band aperture antenna may have a substantially symmetrical shape, such as, for examples, a rectangular shape, a square shape, a circular shape, an oval shape, a C shape, a U shape, an inverted-U shape, a loop shape, an arc shape, or the like. Alternatively, the multi-band aperture antenna may have a non-symmetrical shape. The non-radiating exciter may have a substantially symmetric shape, such as a circular shape, an oval shape, a C shape, a rectangular shape, a triangular shape, a square shape, or the like. Alternatively, the non-radiating exciter may have a non-symmetrical shape.

In another embodiment, a user device includes a structural member associated with an existing electronic component of the user device, and a slot antenna having a slot opening formed in the material of the structural member. The structural member may be a metallic support member of a display, a touchpad, or a touchscreen of the user device, a metallic housing, a metallic portion of a non-metallic housing, a metallic bezel, a metallic support member of a circuit board, such as a printed circuit board (PCB), or metallic support members of other existing components, such as keyboards, buttons, displays, circuits, or the like.

Embodiments of the present invention overcome the above shortcomings by virtually expanding the current surface of the multi-band aperture antenna, reducing the discontinuities of the current flow within the limited space of the multi-band aperture antenna. The embodiments described herein allow the multi-band aperture antenna to be used in wireless communication systems for multi-band or wideband applications, like 3G applications or ultra-wide band (UWB) applications. By constructing the multi-band aperture antenna into a structural member of an existing device component, no additional volume is added to the user device to accommodate the multi-band aperture antenna.

FIGS. 2A-2D illustrate a user device 205 having a slot antenna formed in a metallic support member that holds a display of the user device 205 according to one embodiment. The user device 205 is capable of communicating with another device, such as an item providing system, via a network (e.g., public network such as the Internet or private network such as a local area network (LAN). The user device 205 is variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user device 205 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

Figures 2A, 2B:
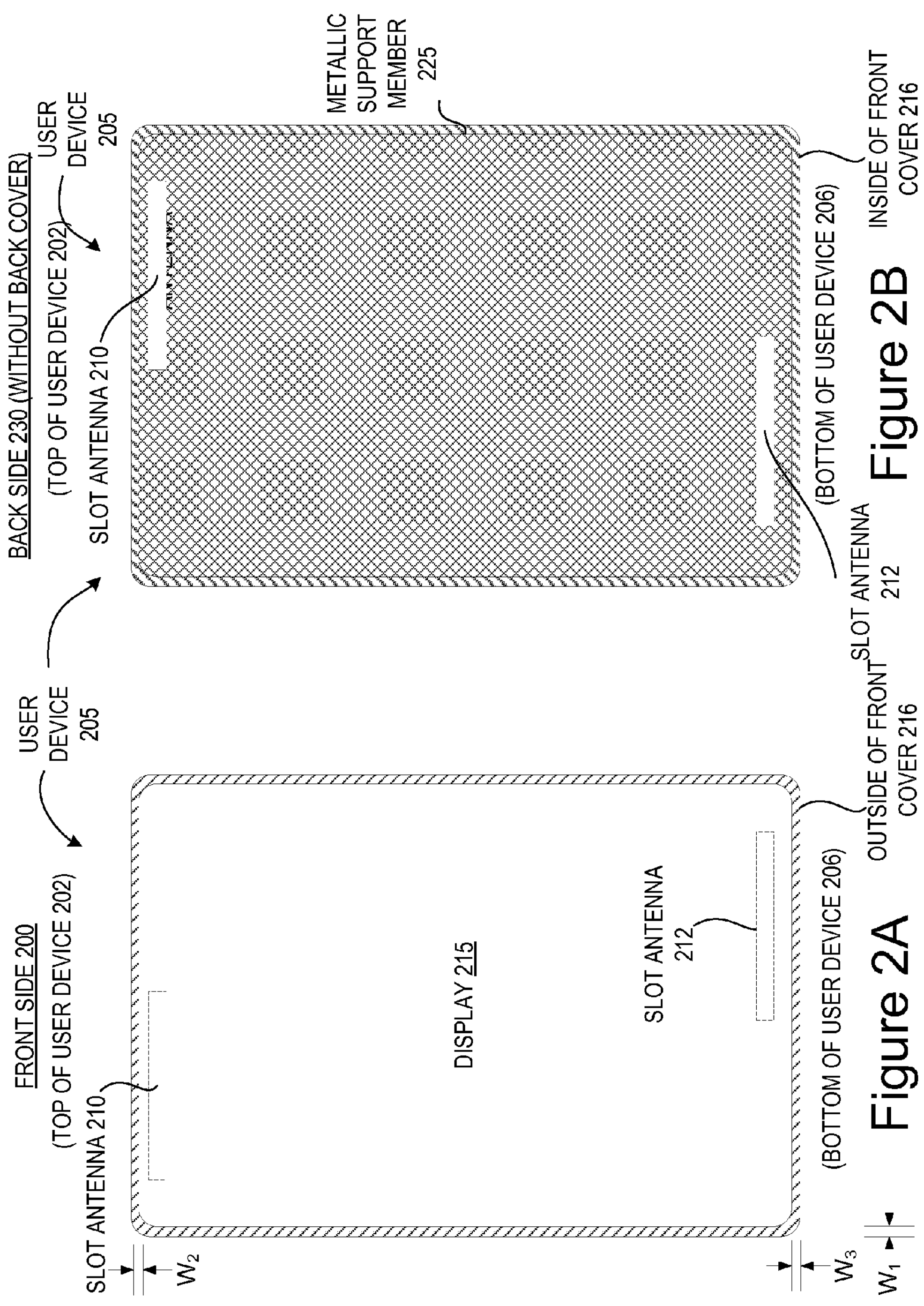
FIG. 2A illustrates a front side of a user device having a slot antenna formed in a metallic support member that holds a display of the user device according to one embodiment.
FIG. 2B illustrates a back side of the metallic support member of the user device of FIG. 2A.
Figure 2D:
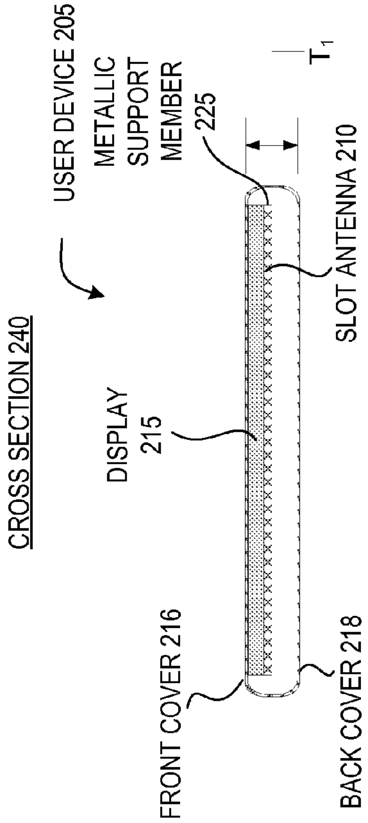
FIG. 2D illustrates a cross-sectional view of the user device of FIG. 2A.

In the depicted embodiment, the user device 205 includes the display 215 housed in a front cover 216 on the front side 200. The display 215 may use any available display technology, such as electronic ink (e-ink), liquid crystal display (LCD), transflective LCD, light emitting diodes (LED), laser phosphor displays (LSP), and so forth. The metallic support member 225 is an existing structural member that holds the display 215 within the user device 205. The metallic support member 225 may be part of the display assembly or may be a separate piece that is secured to the display assembly. The metallic support member 225 is constructed of a metallic material, such as metal, metal alloy, or other conductive material. The metallic support member 225 is disposed within the front and back covers 216 and 218 of the housing of the user device 205. As shown in FIG. 2B, which shows a back side view 230 without the back cover 218, the metallic support member 225 is disposed on the back side of the display 215. FIG. 2D also shows that the metallic support member 225, in which the slot antenna 210 (and/or slot antenna 212), is disposed behind the display 215 relative to the front cover 216. It should be noted that although the front cover 216 houses only the display 215, in other embodiments, the user device 205 may include other inputs housed in the front cover 216 on the front side 200 or the sides of the user device 205, such as a keyboard, buttons, touch pad, microphones, or other input mechanism. The user device 205 may also include types of output mechanisms, such as speakers or the like. Alternatively, one or more inputs may be combined with the display 215 into one or more touch screens.

Disposed within the user device 205 is the slot antenna 210 having a slot opening (also referred to as a hole, an aperture, or a slot cut out) in the existing metallic support member 225. In one embodiment, the slot opening is left open, forming an air slot opening. In another embodiment, the slot opening is filled with dielectric material. When the metallic surface of the metallic support member 225 is driven as an antenna by a driving frequency, the slot opening radiates electromagnetic energy. The shape and size of the slot opening, as well as the driving frequency, determine the radiation pattern. The radiation patterns of slot antennas are typically omnidirectional when using a single slot opening. The slot opening's size, shape, and cavity offer design variables that can be used to tune performance of the slot antenna 210.

As shown in FIG. 2B, the slot antenna 210 is positioned near a top 202 of the user device 205. However, the slot antenna 210 may also be positioned at other locations, such as at a side (e.g., left or right side) of the user device 205 or near the bottom 206 of the user device 205. In another embodiment, two or more slot antennas are formed in the metallic support member 225, such as the slot antenna 210 at the top 202 and the slot antenna 212 at the bottom 206 as depicted in FIG. 2B. It should also be noted that the slot antenna 210 and 212 are illustrated with dashed lines to indicate that the slot openings are formed on the metallic support member 225, which is within the front cover 216 (FIG. 2A) and the back over 218 (FIG. 2C).

By disposing the slot antenna 210 (and/or slot antenna 212) in the metallic support member 225 that holds the display 215, the overall height and/or width of the user device 205 does not increase. In effect, there is no increase in the volume of the user device 205 to accommodate the slot antenna 210. This may allow the user device 205 to use a larger display than the conventional user devices where the antenna is disposed in a space above, below, or behind the display as described above. For example, in one embodiment, the space ($W_2$) between the display 215 and the top 202 of the user device 205 can be reduced, as well as the space ($W_3$) between the display 215 and the bottom 206. In another embodiment, the space ($W_1$) between the display 215 and the side(s) of the user device 205 can be reduced.

Although the embodiment of FIG. 2A illustrates the front size cover 216, in another embodiment, the display 215 is housed without the front cover 216, for example, using a bezel to hold the display 215 with the front cover 212. The bezel may be a metallic or non-metallic band having a groove and a flange (projecting lip) holding the display 215 in the housing. Alternatively, other objects may be used to hold the display 215, such as an outer rim or a ring.

Figure 2E:
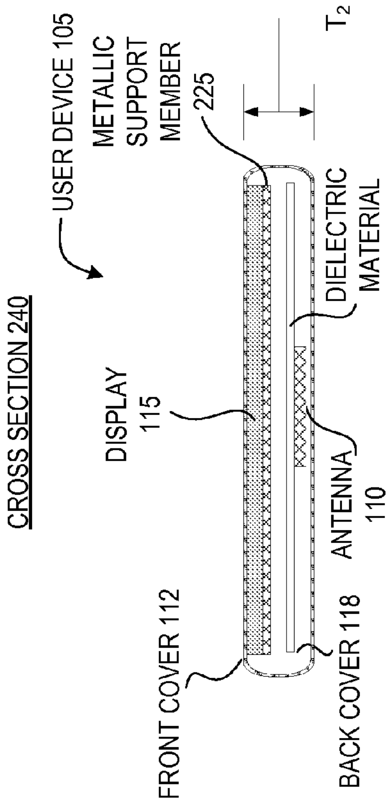
FIG. 2E illustrates a cross-sectional view of a conventional user device having an antenna.
Figure 2C:
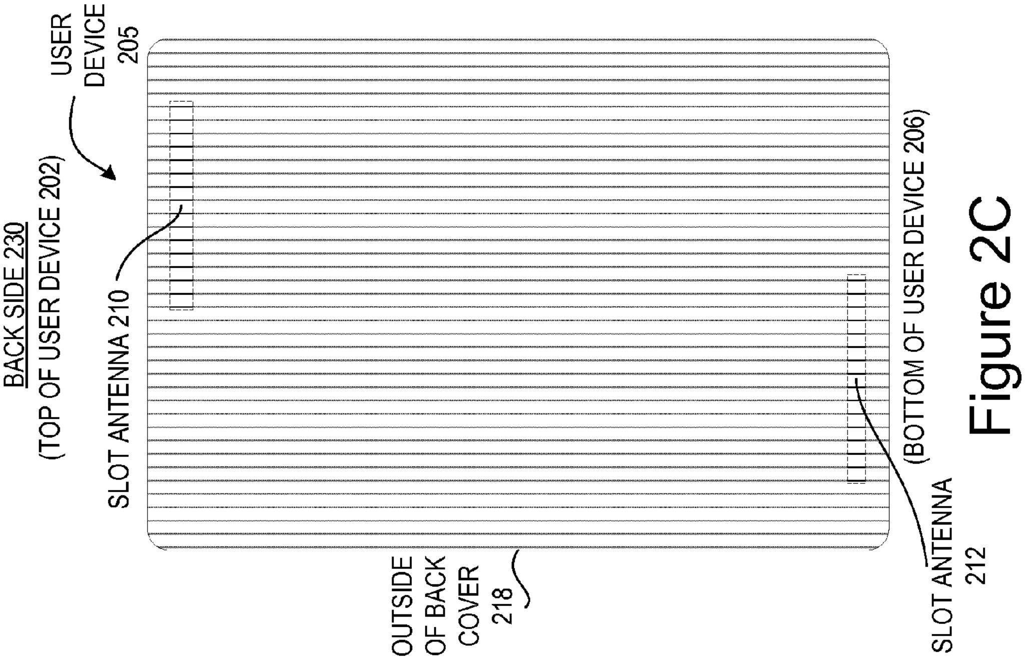
FIG. 2C illustrates a back side of the user device of FIG. 2A.

As shown in FIG. 2C, the thickness ($T_1$) of the user device 205 is not increased to accommodate the antenna 210, since the antenna 210 is disposed in the metallic support member 225. In contrast, FIG. 2E illustrates a cross-sectional view of a conventional user device having the antenna 110 disposed on a dielectric member behind the display 115. Using the dielectric material to dispose the antenna within the user device 105, the thickness ($T_2$) of the user device 105 is greater than the thickness ($T_1$) of the user device 205. Similarly, if the dielectric material is disposed above or below the display 115, the overall height and/or width of the user device 105 is greater than the height and/or width of the user device 205.

Although the embodiments of FIGS. 2A-2D describe the slot antennas 210 and 212 being disposed in the metallic support member 225 of the display 215, in other embodiments, the slot antennas 210 and 212 can be disposed in other structural members associated with an electronic component of the user device. In one embodiment, the electronic component is a circuit board and the structural member is a metallic support member that holds the circuit board, a metal ground plate of the circuit board, a metal back panel of an assembly that holds the circuit board, or the like. In another embodiment, the electronic component is a user input device (e.g., touchpad, touchscreen, keyboard, keypad, button panel, etc) and the structural member is a metallic support member that holds the user input device, a metal ground plate of the user device, a metal back panel of an assembly that holds the user input device, or the like. In another embodiment, the structural member is a metallic housing of the user device 205 (e.g., back and/or front covers 212, 218 of the housing). In another embodiment, the structural member is a non-metallic housing of the user device 205 (e.g., back and/or front covers 212, 218) having metallic portions. In another embodiment, the structure member is a metallic bezel of the user device 205, as described and illustrated in FIGS. 3A-3C.

Figure 3B:
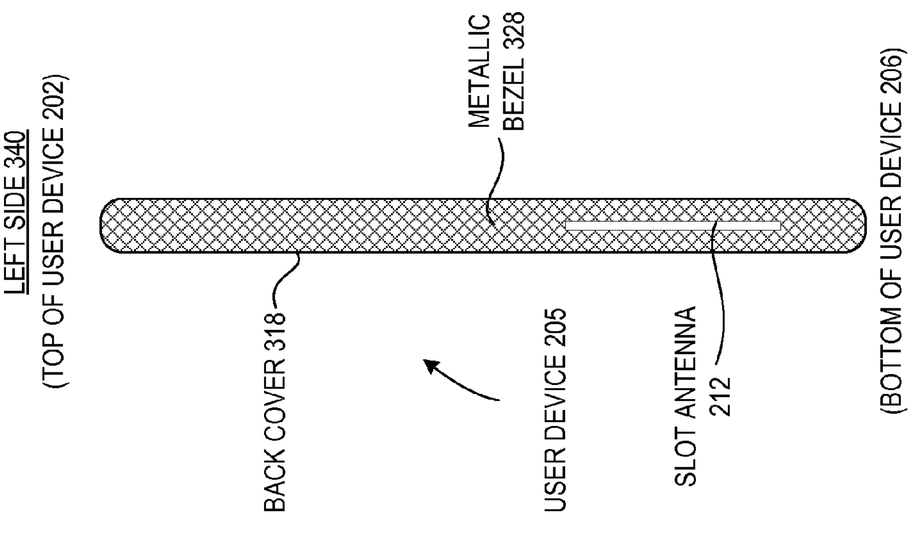
FIG. 3B illustrates a left side of the user device of FIG. 3A.
Figure 3A:
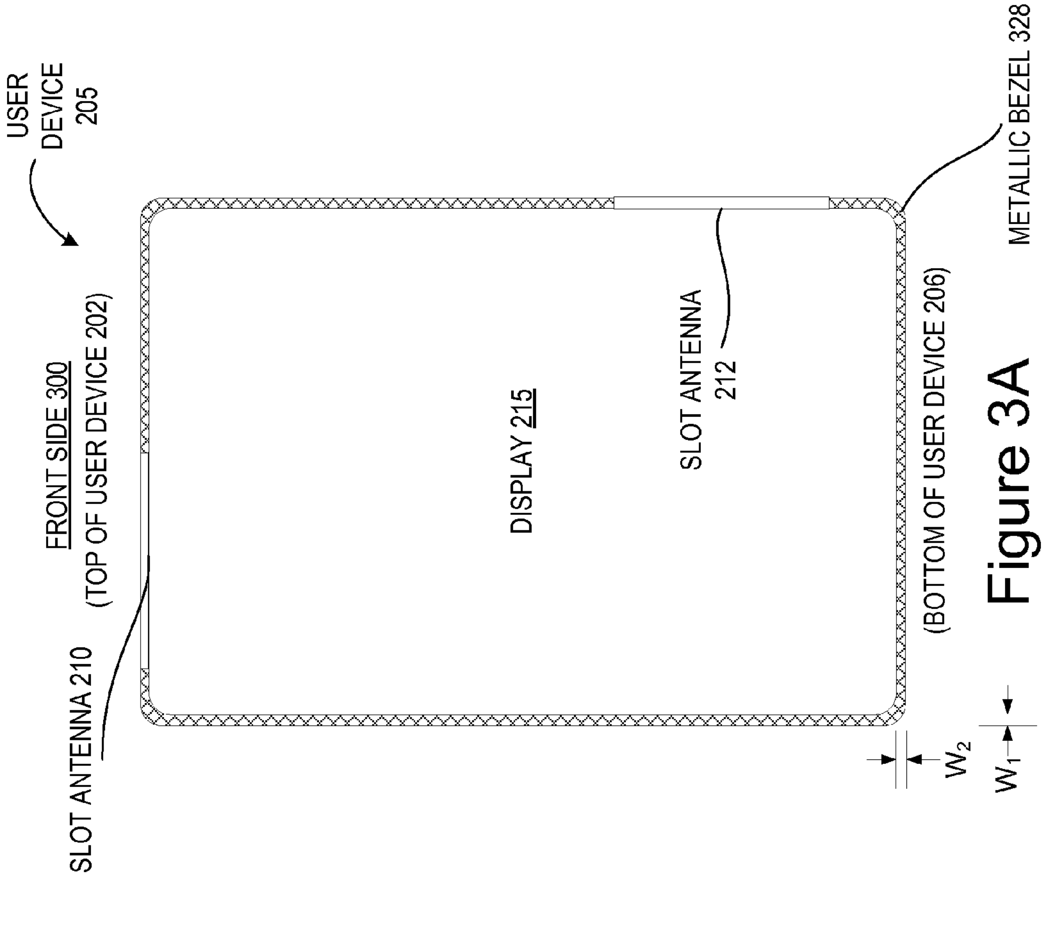
FIG. 3A illustrates a front side of a user device having two slot antennas disposed in a bezel of the user device according to one embodiment.
Figure 3C:
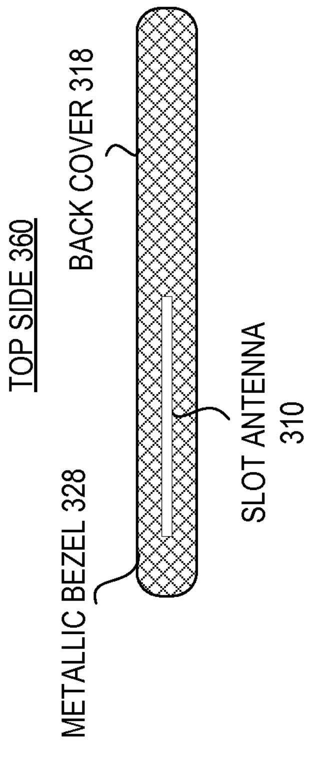
FIG. 3C illustrates a top side of the user device of FIG. 3A.

FIGS. 3A-3C illustrate a front side 300, a left side 340, and a top side 360 of the user device 205 having two slot antennas disposed in a metallic bezel 328 of the user device 205 according to one embodiment. In this embodiment, the metallic bezel 328 holds the display 215 in its setting within the housing. The metallic bezel 328 may be a band of metallic material containing a groove and a flange (projecting lip) holding the display 215 in the housing. The metallic bezel 328 may be coupled to a back cover 318 and holds the display 215 disposed on the front side 300. In another embodiment, the metallic bezel 328 can be coupled to the back cover 318 and a front cover (such as front cover 216), which houses the display 215. Alternatively, other configurations may be used to form the slot antennas 210 and 212 in a metallic bezel as would be appreciated by one of ordinary skill in the art having the benefit of this disclosure.

It should be noted that since the antennas 210 and 212 are formed in the metallic bezel 328, the slot antennas 210 and 212 may be affected by the presence of conductive objects that are near in contact with the slot openings, such as a user's hand. For example, the presence of a user's finger on the slot antenna 210 may change the electrical characteristics of the slot antenna 210, possibly reducing the reception or transmission by the slot antenna 210. In some embodiments, the slot antennas 210 and 212 can be insulated using insulating material. In other embodiments, the slot antennas 210 and 212 can be labeled or otherwise marked to allow the user to know where the antennas are located on the metallic bezel 328. Alternatively, the slot antennas 210 and 212 can be hidden from the user. In another embodiment, the slot antennas 210 and 212 can be insulated using a separate non-metallic cover having insulating material.

It should be noted that the embodiments of FIGS. 3A-3C illustrate two slot antennas 210 and 212 disposed at the top 202 and left side 340 of the user device 205, in other embodiments, the antennas 210 and 212 can be disposed in other locations. Also, one slot antenna, or more than two slot antennas, can be formed in the metallic bezel 328.

In another embodiment, a non-metallic bezel can be used that includes cavities in which metallic material can be disposed; the antenna 210 and 310 being disposed in the metallic material within the cavities of the non-metallic bezel. In other embodiments, other structural members that support the display 215 (or other electronic component) within the housing can be used, such as, for examples, an outer rim, a ring, or the like.

Figure 4B:
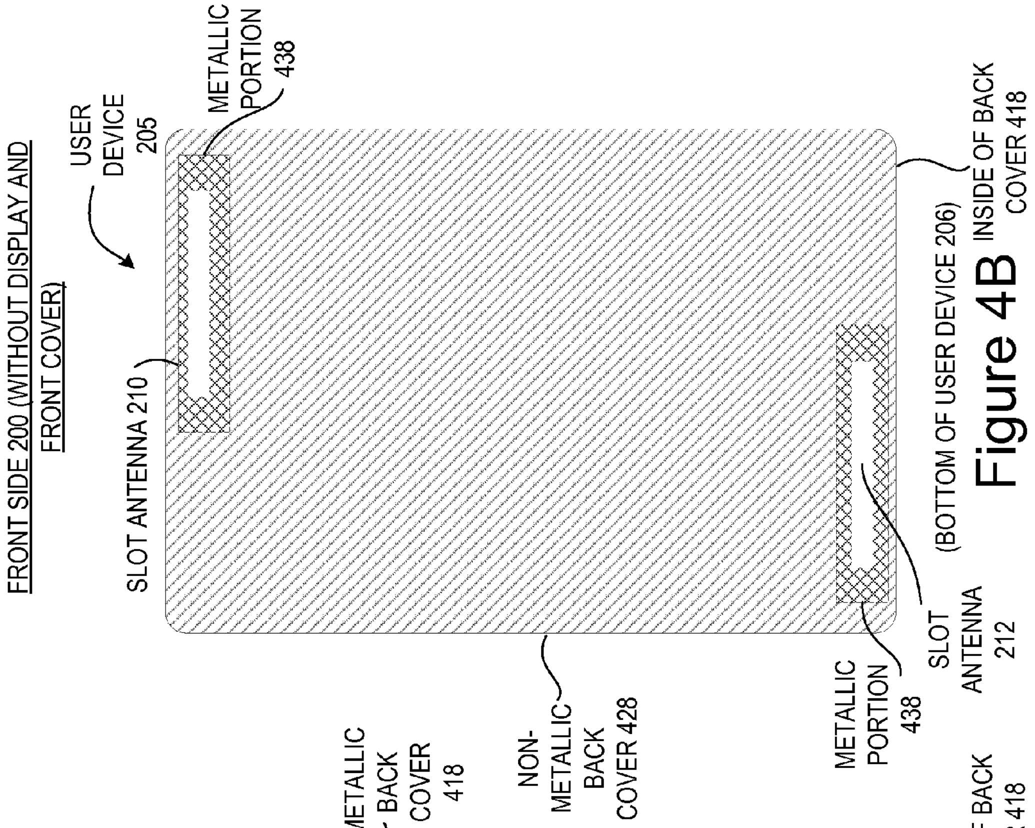
FIG. 4B illustrates a front side of a non-metallic back cover of the user device's housing according to another embodiment.
Figure 4A:
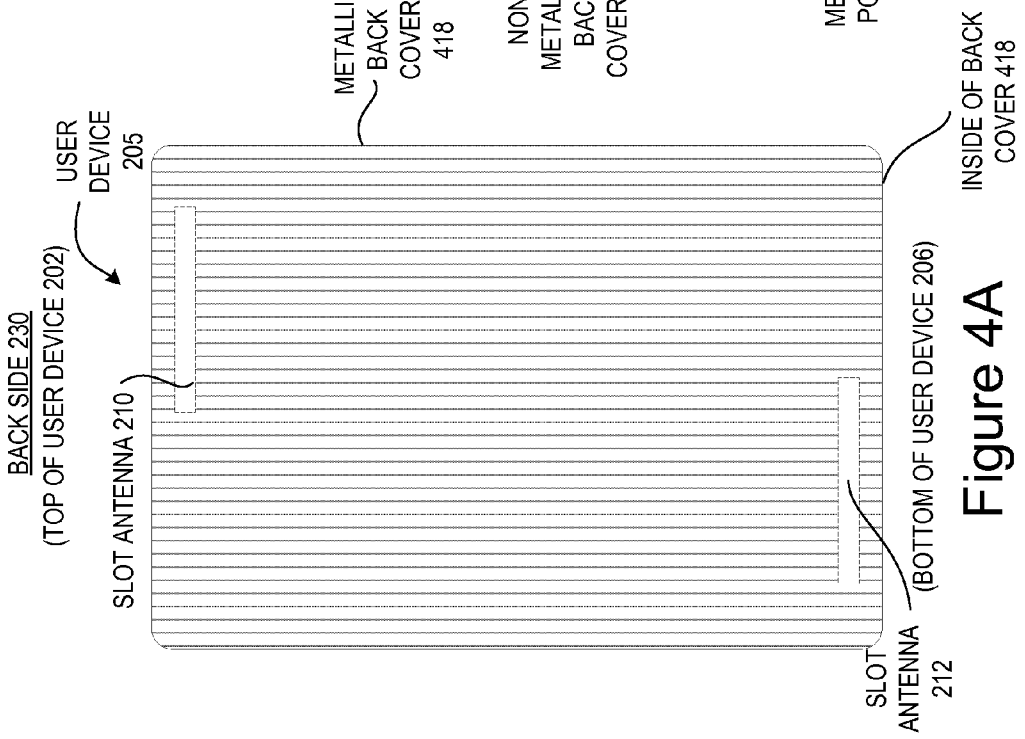
FIG. 4A illustrates a back side of the user device having two slot antennas formed in a metallic back cover of the user device's housing according to one embodiment.

In another embodiment, the slot antennas 210 and 212 can be formed in a metallic housing of the user device 205, as illustrated in FIG. 4A, or in a metallic portions of a non-metallic housing of the user device 205, as illustrated in FIG. 4B.

FIG. 4A illustrates a back side 230 of the user device 205 having two slot antennas 210 and 212 formed in a metallic back cover 418 of the user device's housing according to one embodiment. The metallic back cover 418 is constructed of a metallic material having metal or a metal alloy. The slot openings of the slot antennas 210 and 212 are formed in the metallic back cover 418. In some embodiments, the slot antennas 210 and 212, formed in the metallic back cover 418, can be insulated using insulating material, or using a separate non-metallic cover as described above with respect to the metallic bezel 328. Similarly, the slot antennas 210 and 212 of FIG. 4A can be marked or hidden. In this embodiment, the slot antennas 210 and 212, formed in the metallic back cover 418, are disposed at the top 202 and bottom 206 of the metallic back cover 418, respectively. In other embodiments, the antennas 210 and 212 can be disposed in other locations, such as on the front cover of the user device's housing, on the side of the user device's housing, or the like.

FIG. 4B illustrates a front side 200 of a non-metallic back cover 428 of the user device's housing according to another embodiment. The non-metallic back cover 428 is constructed of a non-metallic material, such as plastic, and includes one or more metallic portions 438 (constructed of metal and/or metal alloys). In one embodiment, the non-metallic back cover 428 includes one or more cavities in which metallic material can be disposed to form the metallic portions 438, and the antennas 210 and 212 are formed in the metallic portions 438. In another embodiment, a first portion of the non-metallic back cover 428 is constructed of the non-metallic material, and a second portion of the non-metallic back cover 428 is constructed of metallic material. The antennas 210 and 212 are formed in the second portion.

In the depicted embodiment, the slot antennas 210 and 212, formed in the metallic portions 438, are disposed at the top 202 and bottom 206 of the non-metallic back cover 428, respectively. In other embodiments, the antennas 210 and 212 can be disposed in other locations, such as on the front cover 216 of the user device's housing, on the side of the user device's housing, or the like.

It should be noted that the slot antennas 210 and 212 of the embodiments of FIGS. 2A-4B have a rectangular shape. In other embodiments, the slot antennas may have other shapes, such as, for examples, square shapes, circular shapes, oval shapes, C shapes, U shapes, inverted-U shapes, loop shapes, arc shapes, or the like. In one embodiment, the slot antenna has a single slot opening. In another embodiment, the slot antenna has multiple slot openings. In another embodiment, the slot antenna has a substantially symmetrical shape. In another embodiment, the slot antenna has one or more slot openings that are not substantially symmetrical in shape.

As described above, the radiation patterns of slot antennas are typically omnidirectional when using a single slot opening, and typically have a narrow bandwidth. In the following embodiments, a non-radiating exciter, which is operatively coupled to one or more slot openings of a multi-band aperture antenna, is used to feed the multi-band aperture antenna, while reducing the discontinuities of the current flow of the radiating antenna. The non-radiating exciter allows the slot openings of the aperture antenna to operate as multi-band aperture antenna that radiates electromagnetic energy in multiple frequency bands. For example, the multi-band aperture antenna may be configured to operate in multiple frequency bands, such as PCS 1900 (1850-1990 MHz), UMTS (1920-2170 MHz), WLAN 802.11a/b/g (2400-2483 MHz and 5250-5350 MHz), Bluetooth frequency bands, or the like. The multi-band slot antenna 210 can be used to support WiFi, GSM, CDMA, WCDMA, TDMA, UMTS, LTE, or other types of wireless communication protocols of digital network wireless technologies. The multi-band aperture antenna can be used in wireless communication systems for multi-band or wideband applications, like 3G applications or ultra-wide band (UWB) applications. In some embodiments, the non-radiating exciter and the multi-band aperture antenna are constructed into a structural member of an existing device component like described above with respect to the slot antennas 210 and 212 of FIGS. 2A-4B. By constructing the multi-band aperture antenna and the non-radiating exciter into the structural member of an existing device component, no additional volume is added to the user device to accommodate the multi-band aperture antenna and the non-radiating exciter.

Figures 5A, 5B:
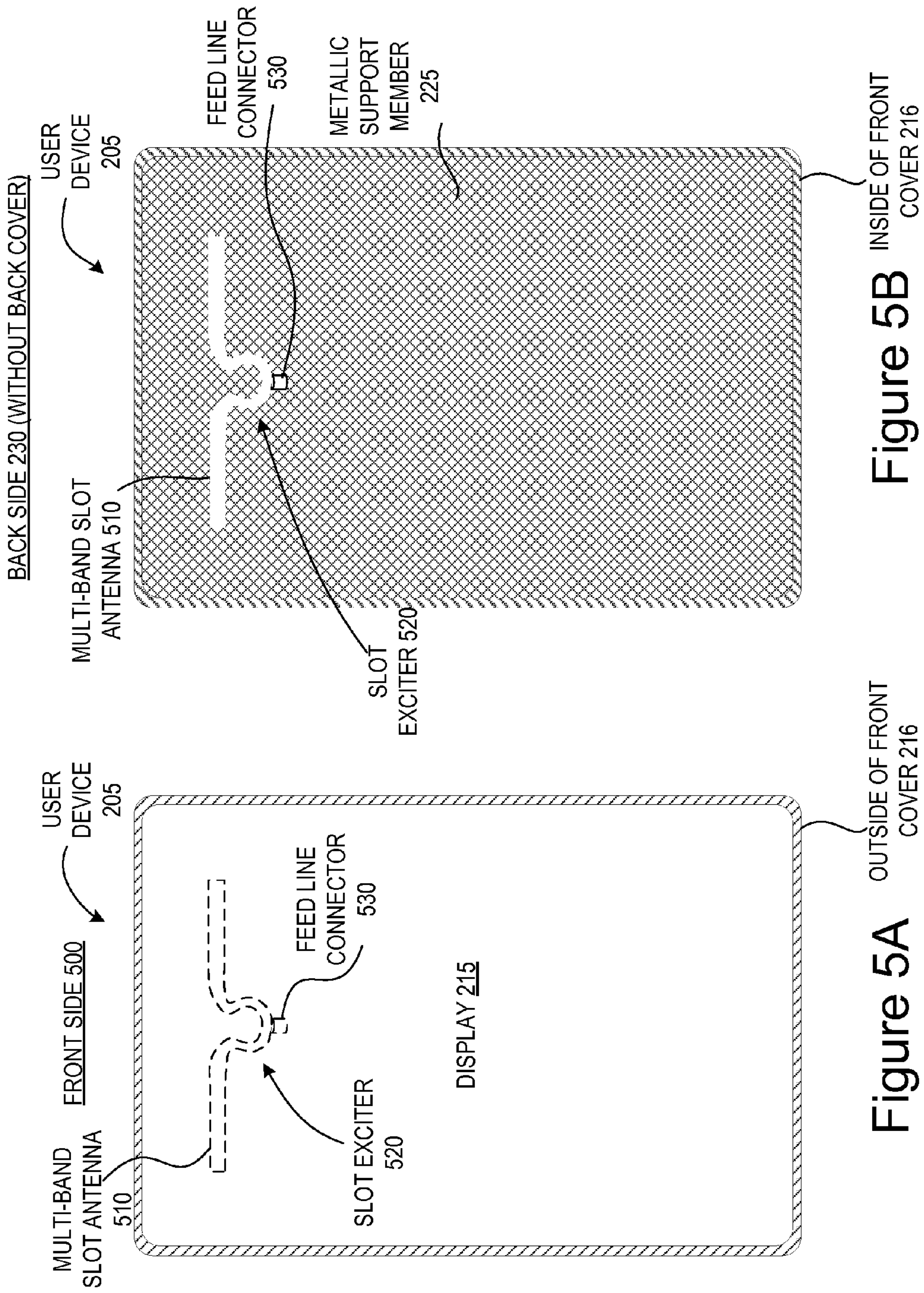
FIG. 5A illustrates a front side of a user device a multi-band slot antenna and a slot exciter formed in a metallic support member that holds a display according to one embodiment.
FIG. 5B illustrates a back side of the metallic support member of FIG. 5A.
Figure 5D:
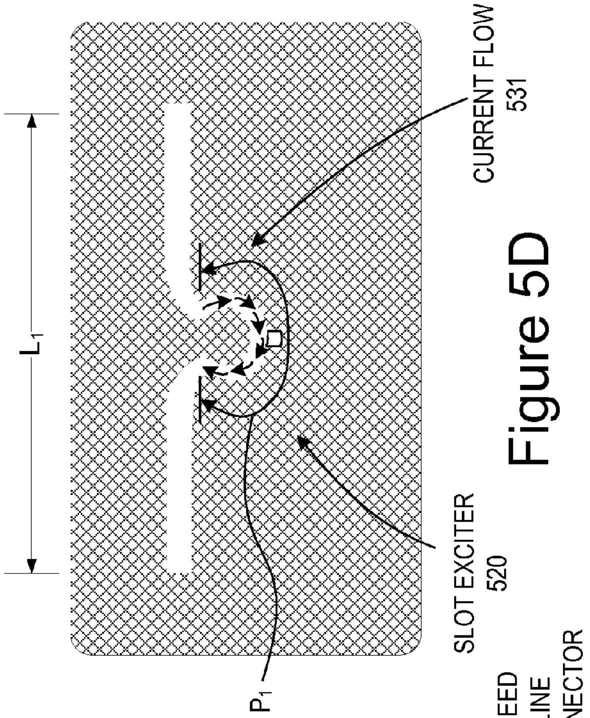
FIG. 5D illustrates a current flow of the slot exciter of FIG. 5A according to one embodiment.
Figure 5E:
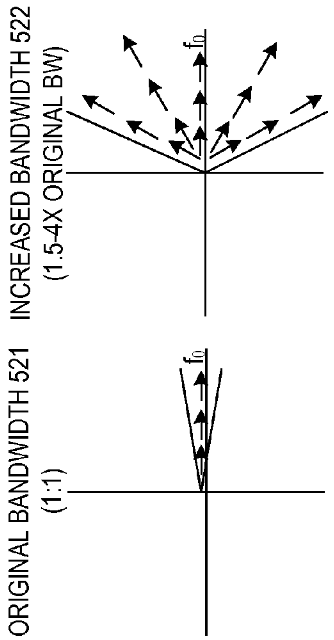
FIG. 5E illustrates an increase in bandwidth of the multi-band slot antenna of FIG. 5A according to one embodiment.
Figure 5C:
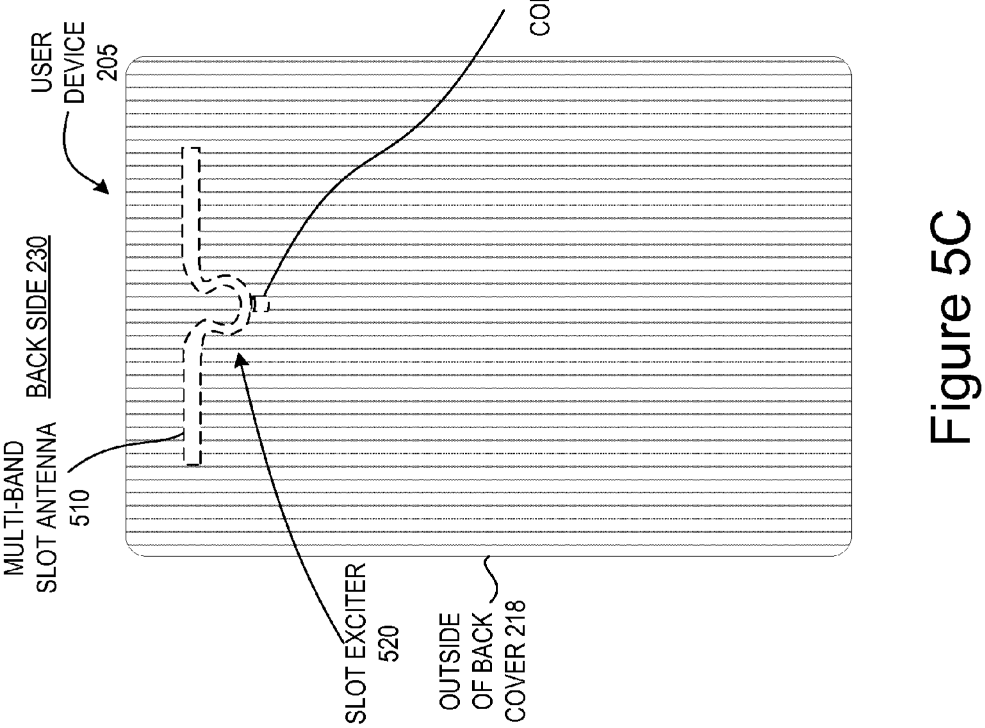
FIG. 5C illustrates a back side of the user device of FIG. 5A.

FIGS. 5A-5C illustrate the user device 205 having a multi-band slot antenna 510 and a slot exciter 520, which are formed in the metallic support member 225 that holds a display 215. The user device 205 of FIGS. 5A-5C is similar to the user device 205 described in FIGS. 2A-2D, except the multi-band slot antenna 510 and slot exciter 520 are formed in the metallic support member 225, instead of the slot antennas 210 and 212. As shown in FIG. 5B, which shows a back side view 230 without the back cover 218, the metallic support member 225 is disposed on the back side of the display 215 and the multi-band slot antenna 510 and slot exciter 520 are formed as slot openings (also referred to has holes, apertures, or slot cut out) in the existing metallic support member 225. In one embodiment, the slot openings are left open, forming air slot openings. In another embodiment, the slot openings are filled with dielectric material. When the slot exciter 520 is driven by a driving frequency, the slot exciter 520 drives the multi-band slot antenna 510 as an antenna at the driving frequency and the slot opening of the multi-band slot antenna 510 radiates electromagnetic energy. It should be noted that the slot exciter 520, despite being represented as a continuous single slot opening the metallic support member 225, does not radiate. In effect, the single slot opening has a radiating portion (labeled as the multi-band slot antenna 510) and a non-radiating or excitation portion (labeled as the slot exciter 520) that is used to excite the radiating portion. By exciting the radiating portion, the excitation portion virtually expands the current surface of the radiating portion, increasing the bandwidth of the multi-band slot antenna 510. The term "exciter," as used herein, refers to a wire or an absence of metallic material that is used to excite current of the antennas (e.g., excite current around the slot or apertures of the aperture antennas), as described herein, and should not be confused with exciters that are used to feed high-power amplifiers (sometimes the part that contains the oscillator, modulator, and audio processor is called the exciter).

Figure 7A:
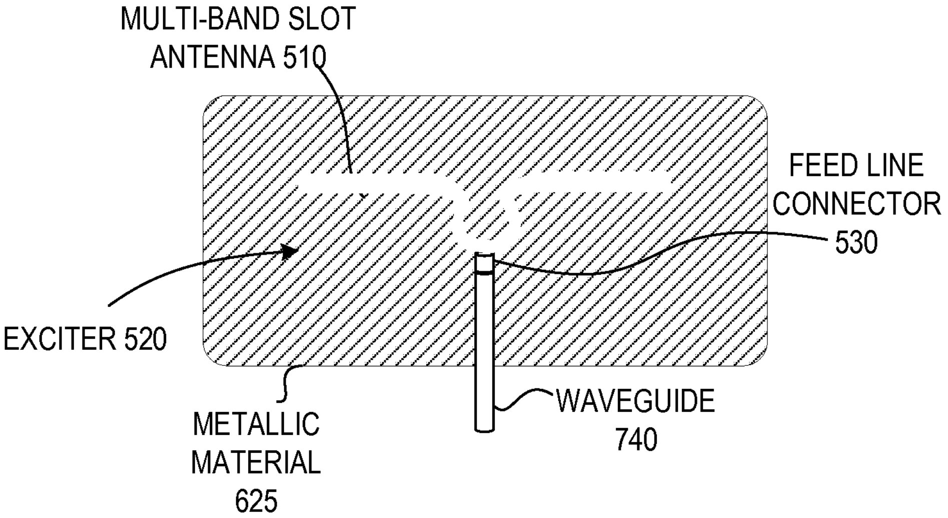
FIG. 7A illustrates a waveguide coupled to the slot exciter of FIG. 5A according to one embodiment.
Figure 7B:
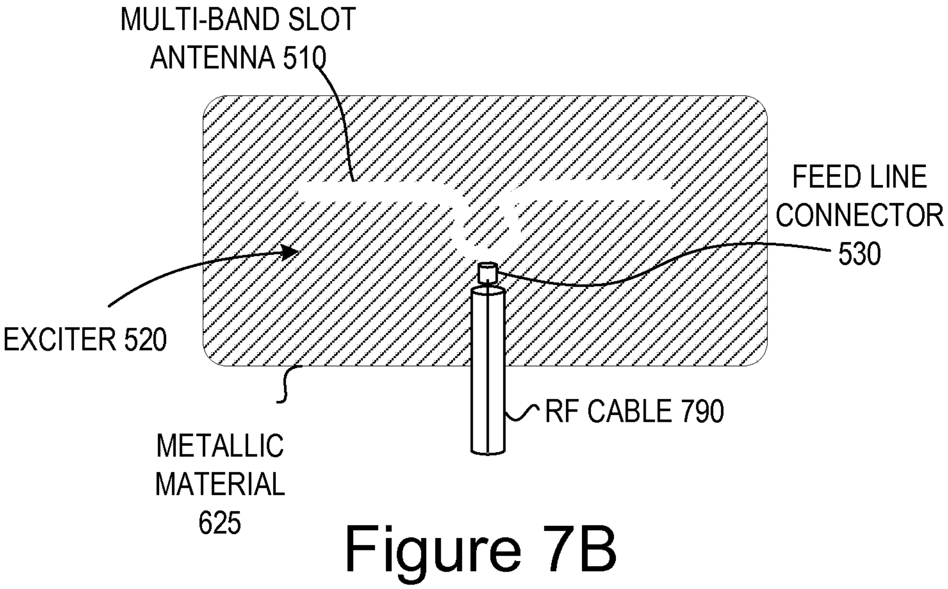
FIG. 7B illustrates a radio frequency (RF) cable coupled to the slot exciter of FIG. 5A according to another embodiment.

In one embodiment, the slot exciter 520 is driven by a feed line (also referred to as the transmission line), which is a physical connection that carriers the RF signal to and/or from the multi-band slot antenna 510, via a feed line connector 530. The feed line connector 530 may be any one of the common types of feed lines, including RF cables (e.g., coaxial feed lines, twin-lead lines, or the like), or waveguides. A waveguide, in particular, is a hollow metallic conductor with a circular or square cross-section, in which the RF signal travels along the inside of the hollow metallic conductor. Alternatively, other types of connectors can be used. FIG. 7A illustrates a waveguide 740 coupled to the slot exciter 520 of FIG. 5A according to one embodiment. FIG. 7B illustrates a radio frequency (RF) cable 790 coupled to the slot exciter 520 of FIG. 5A according to another embodiment.

In the depicted embodiment, the feed line connector 530 is physically coupled to the exciter 520 at the bottom center of the slot exciter 520 at the back side 230 of the metallic support member 225. In other embodiments, the feed line connector 530 may be physically coupled to the slot exciter 520 at other locations as would be appreciated by one of ordinary skill in the art having the benefit of this disclosure.

FIG. 5D illustrates a current flow 531 of the slot exciter 520 of FIG. 5A according to one embodiment. When driven, the current flows around the perimeter $P_1$ of the slot exciter 520. The current flow 531 excites the current flow associated with the multi-band slot antenna 510. The current flow 531 of the slot exciter 520 increases the bandwidth of the multi-band slot antenna 510. In one embodiment, the slot openings of the multi-band slot antenna 510 has a length $L_1$ of approximately lambda (λ)/4 to lambda (λ)/2, where lambda (λ) is the length of one electromagnetic wave at a frequency of the multi-band slot antenna 510, and the slot exciter 520 has a perimeter ($P_1$) that is equal to or less than approximately ¼ the length ($L_1$) of the multi-band slot antenna 520. For example, for a multi-band slot antenna that supports 850 MHz and 1900 MHz, the length $L_1$ may be approximately 80 mm. Alternatively, other lengths may be used for the one or more slot openings of the multi-band slot antenna, and other perimeters can be used for the exciters as would be appreciated by one of ordinary skill in the art having the benefit of this disclosure.

Without the slot exciter 520, the slot opening of the multi-band slot antenna 510 is configured to operate in a single frequency band (center frequency $f_0$). However, using the slot exciter 520, the slot opening of the multi-band slot antenna 520 is configured to operate in multiple bands. The slot exciter 520 excites the multi-band slot antenna 510 to virtually expand the current surface and reduce the discontinuities of the current flow within the limited space of the multi-band slot antenna 510. The slot exciter 520 can be used to reduce the Q factor of the multi-band slot antenna 510. The Q factor is a dimensionless parameter that characterizes the slot antenna's bandwidth relative to its center frequency ($f_0$); the higher Q indicates a lower bandwidth, and the lower Q indicates a higher bandwidth.

FIG. 5E illustrates an increase in bandwidth of the multi-band slot antenna of FIG. 5A according to one embodiment. In this embodiment, the slot exciter 520 increases the bandwidth 522 of the multi-band slot antenna 510 by approximately 1.5 to 4 times the original bandwidth 521 of the multi-band slot antenna 510 without the slot exciter 520. The original bandwidth 521 is considered narrowband (1:1), and the increased bandwidth 522 is considered multi-band or ultra-wide band (1.5 to 4 times the original bandwidth). Alternatively, other bandwidths may be achieved.

In the depicted embodiment of FIGS. 5A-5C, the slot exciter 520 and multi-band slot antenna 520 form a single slot opening in the metallic support member 225. In this embodiment, the multi-band slot antenna 510 and the slot exciter 520 are physically coupled. In another embodiment, the slot exciter 520 is physically separated from the multi-band slot antenna 510. For example, the slot exciter 520 can be disposed near the multi-band slot antenna 510 in the metallic support member 225, such as a separate slot opening having a gap (e.g., 0.5 to 1 mm) between the one or more slot openings of the multi-band slot antenna 510. It should be noted that the slot exciter 520 is disposed close enough to allow the slot exciter 520 to parasitically excite the slot antenna's surface current flow at the slot opening when the slot exciter is physically separated from the slot opening(s) of the multi-band slot antenna 510. It should also be noted that the embodiments in which the exciter and multi-band slot antenna are physically separated with a gap may have a better performance than embodiments in which the exciter is physically coupled.

In the depicted embodiment of FIGS. 5A-5C, the exciter 520 is operatively coupled with the multi-band slot antenna 510. In other embodiments, an exciter can be operatively coupled with other antennas, such as a slot loop antenna (FIGS. 6E and 6F), a microstrip antenna, such as a plate inverted-F antenna (PIFA) (FIG. 6G) or a folded inverted conformal antenna (FICA), or the like.

In the depicted embodiment of FIGS. 5A-5C, the exciter is a slot exciter constructed as a slot opening in the metallic support member 225. Alternatively, other types of exciters may be used, such as, for example, a wire exciter (FIG. 6D) (e.g., a wire or a conductive trace). As described herein, the exciter may be physically connected to the antenna, or alternatively, physically separated from the antenna.

In the depicted embodiment of FIGS. 5A-5C, the slot exciter 520 has a loop shape that connects the two slot openings of the multi-band slot antenna 510. In other embodiments, other shapes can be used for the slot exciter, such as, for example, a U shape, an inverted-U shape, a C shape, an inverted-C shape, a horseshoe shape, a rectangular shape, a square shape, an oval shape, a circular shape, an arc shape, or the like. In one embodiment, the slot exciter is substantially symmetrical in shape. In another embodiment, the slot exciter is not symmetrical in shape. Various slot exciters are illustrated in FIGS. 6A-6C and 6E-6F. In the depicted embodiment of FIGS. 5A-5C, the multi-band slot antenna 510 has two slot openings, each having a substantially rectangular shape. In other embodiments, other shapes can be used for the multi-band slot antenna 510, such as, for example, a U shape, an inverted-U shape, a C shape, an inverted-C shape, a W shape, a M shape, a horseshoe shape, a rectangular shape, a square shape, an oval shape, a circular shape, a loop shape, an arc shape, or the like. In one embodiment, the multi-band slot antenna is substantially symmetrical in shape. In another embodiment, the multi-band slot antenna is not symmetrical in shape. Various multi-band slot antennas are illustrated in FIGS. 6A-6F.

Figure 6A:
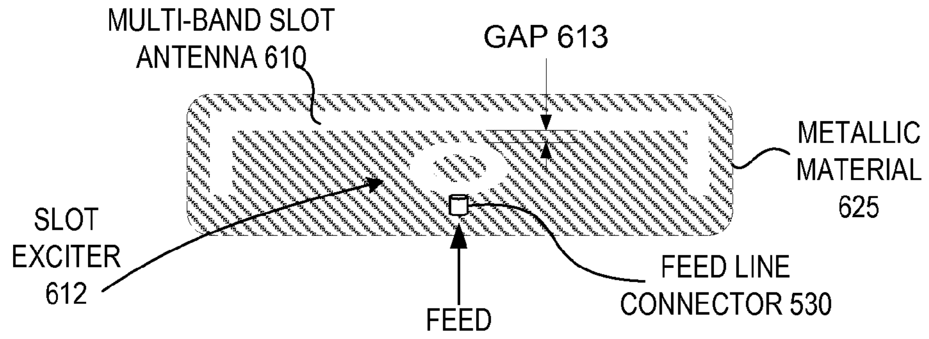
FIG. 6A illustrates a multi-band slot antenna, having an inverted-U shape, and a slot exciter having an oval shape formed in metallic material according to one embodiment.

FIG. 6A illustrates a multi-band slot antenna 610, having an inverted-U shape, and a slot exciter 612 having an oval shape formed in metallic material 625 according to one embodiment. The slot exciter 612 is disposed near the multi-band slot antenna 610 with a gap 613 between the slot exciter 612 and the multi-band slot antenna 610. The slot exciter 612 is disposed along an axis that is substantially perpendicular to the longitudinal axis of the multi-band slot antenna 610. The slot exciter 612 is centered relative to the multi-band slot antenna 610.

Figure 6B:
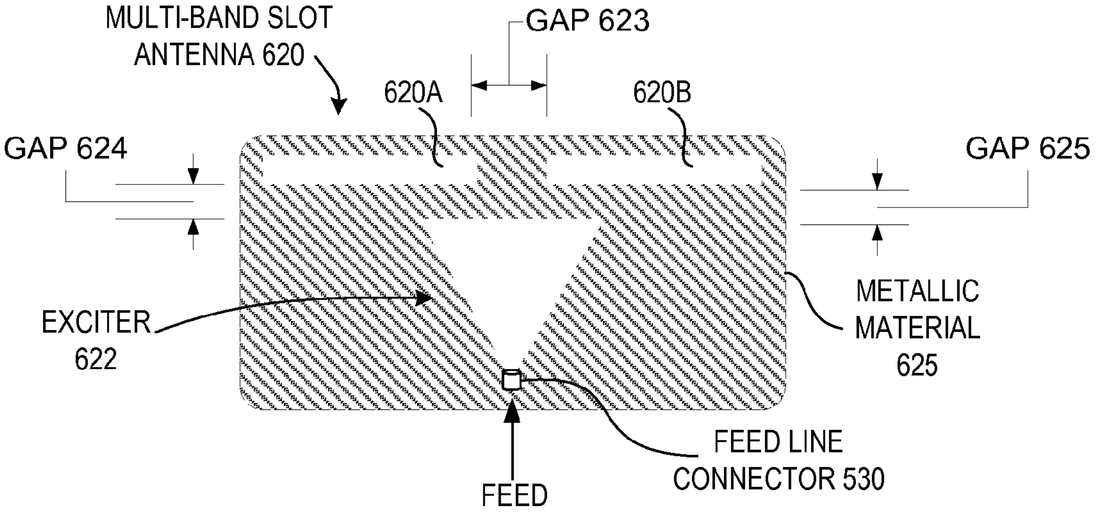
FIG. 6B illustrates a multi-band slot antenna, having two rectangular slot openings, and an exciter having a triangular shape formed in metallic material according to another embodiment.

FIG. 6B illustrates a multi-band slot antenna 620, having two rectangular slot openings 620A and 620B, and an exciter 622 having a triangular shape formed in metallic material 625 according to another embodiment. In this embodiment, the two slot openings 620A and 620B are disposed on a first axis with a gap 623 between the two slot openings. The slot exciter 612 is disposed near the multi-band slot antenna 610 on a second axis substantially equidistant to the first and second slot openings 620A and 620B with a second gap 624 between the first slot opening 620A and a third gap 625 between the second slot opening 620B. The second axis is substantially perpendicular to the first axis of the multi-band slot antenna 620, and the slot exciter 622 is centered relative to the multi-band slot antenna 620.

Figure 6C:
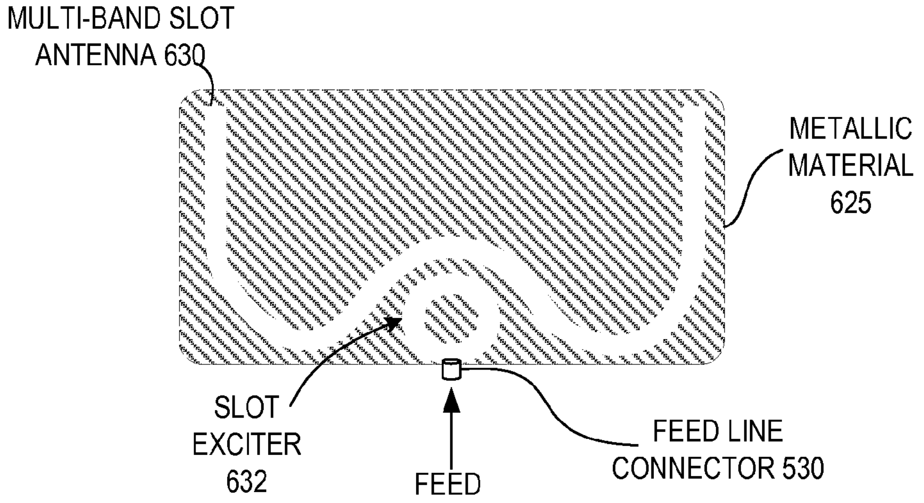
FIG. 6C illustrates a multi-band slot antenna, having a symmetrical shape, and a slot exciter having a circular shape formed in the metallic material according to another embodiment.

FIG. 6C illustrates a multi-band slot antenna 630, having a symmetrical shape, and a slot exciter 632 having a circular shape formed in the metallic material 625 according to another embodiment. The slot exciter 632 is disposed near the multi-band slot antenna 630 with a gap between the slot exciter 632 and the multi-band slot antenna 630. The symmetrical shape is a W shape that curves around the slot exciter 632, increasing the surface area of the slot opening of the multi-band slot antenna 630 that is disposed near the slot exciter 632. The slot exciter 632 is centered relative to the symmetrical W shape of the multi-band slot antenna 630.

Figure 6D:
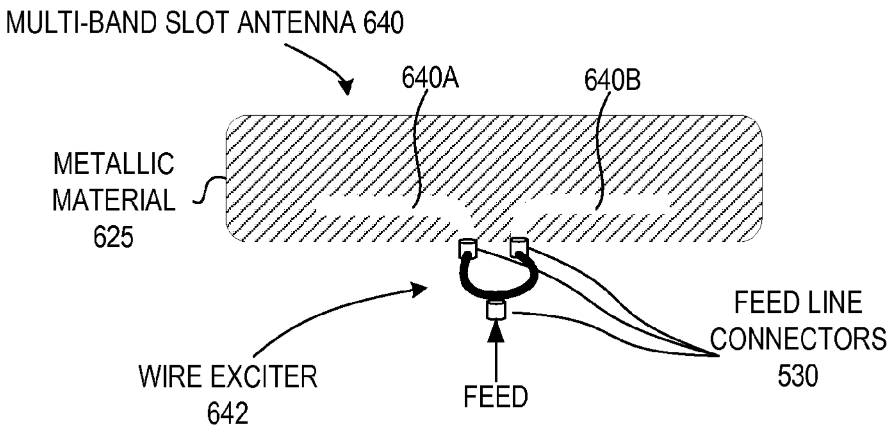
FIG. 6D illustrates a multi-band slot antenna, having two symmetrical slot openings in the metallic material, and a wire exciter coupled to the two symmetrical slot openings, according to another embodiment.

FIG. 6D illustrates a multi-band slot antenna 640, having two symmetrical slot openings 640A and 640B in the metallic material 625, and a wire exciter 642 coupled to the two symmetrical slot openings, according to another embodiment. The wire exciter 642 has a loop shape with one end of the loop physically coupled to the first slot opening 640A, and the other end of the loop physically coupled to the second slot opening 640B. The wire exciter 642 and the two slot openings effectively form the same shape as the multi-band slot antenna 510 and slot exciter 520 of FIGS. 5A-5C, except a wire is used instead of a slot opening. In one embodiment, the wire exciter 642 is implemented as a wire that connects the two slot openings 640A and 640B. In another embodiment, the wire exciter 642 is implemented as a conductive trace that connects the two slot openings 640A and 640B. In one embodiment, the wire exciter 642 is physically coupled to the two slot openings 640A and 640B using two feed line connectors 530.

Figure 6E:
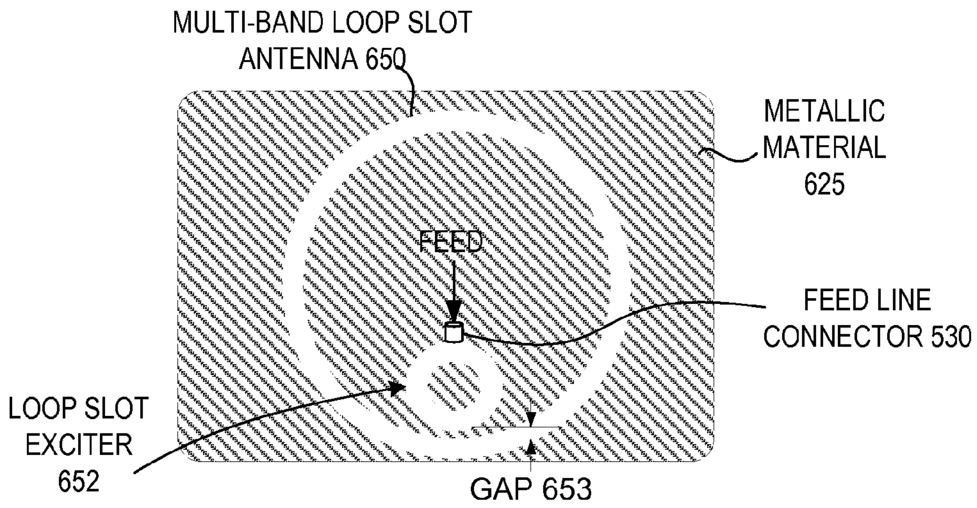
FIG. 6E illustrates a multi-band loop slot antenna, having a circular shape, and a loop slot exciter, having a circular shape, both formed in metallic material according to another embodiment.

FIG. 6E illustrates a multi-band loop slot antenna 650, having a circular shape, and a loop slot exciter 652, having a circular shape, both formed in metallic material 625 according to another embodiment. The loop slot exciter 652 is disposed within the multi-band loop slot antenna 650 with a gap 653 between the loop slot exciter 652 and the multi-band loop slot antenna 650. The loop slot exciter 652 is centered at the bottom of the multi-band loop slot antenna 650. In other embodiments, the loop slot exciter 652 can be disposed at other locations inside or outside the multi-band loop slot antenna 650.

Figure 6F:
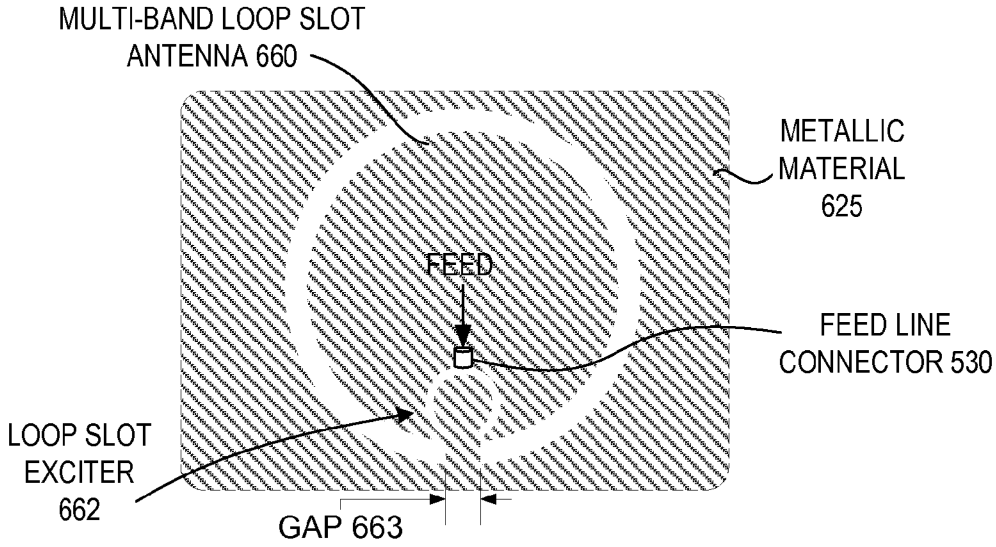
FIG. 6F illustrates a multi-band loop slot antenna, having a C shape, and a loop slot exciter, having a C shape, both formed in metallic material according to another embodiment.

FIG. 6F illustrates a multi-band loop slot antenna 660, having a C shape, and a loop slot exciter 662, having a C shape, both formed in metallic material 625 according to another embodiment. The multi-band loop slot antenna 660 is the same as the multi-band loop slot antenna 650 of FIG. 6E, except the multi-band loop slot antenna 660 has a gap 663 at the bottom end, instead of the slot opening that forms a continuous circle in antenna 650. The loop slot exciter 662 is disposed within the multi-band loop slot antenna 660 with a gap between the slot exciter 662 and the multi-band loop slot antenna 660. The loop slot exciter 662 is similar to the loop slot exciter 652, except the loop slot exciter 662 also has a gap 663 at the bottom end. The loop slot exciter 652 is centered at the bottom of the multi-band loop slot antenna 660. In other embodiments, the slot exciter 662 can be disposed at other locations inside or outside the multi-band loop slot antenna 660. In this embodiment, the multi-band loop slot antenna 660 and the loop slot exciter 662 have the same gape 663. In other embodiments, the respective gaps may be dissimilar.

In the embodiments of FIGS. 6E and 6F, the feed line connector 530 is disposed at the top of the loop slot exciters 652 and 662. In other embodiments, one or more feed line connectors 530 can be physically coupled to the loop slot exciters 652 and 662 at other locations.

Figure 6G:
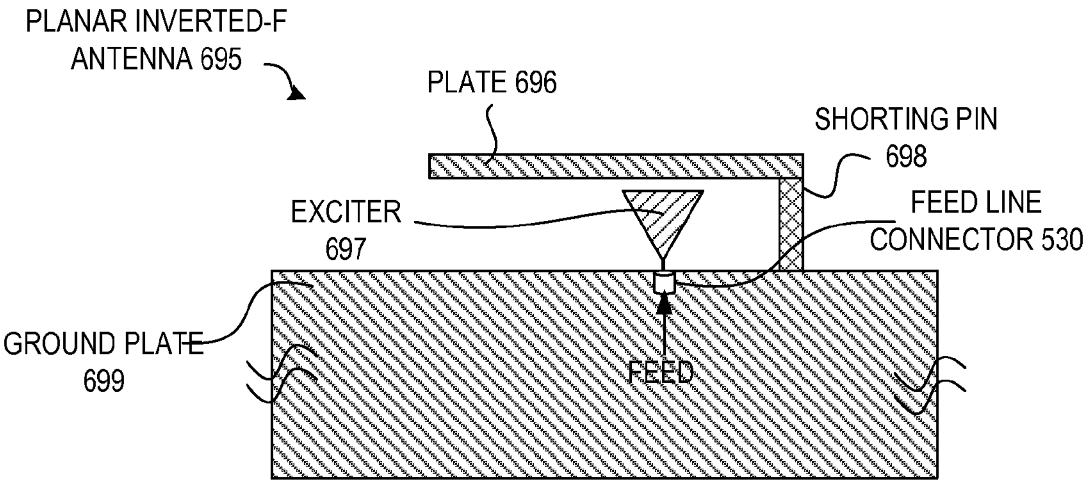
FIG. 6G illustrates a planar inverted-F antenna and an exciter according to one embodiment.

FIG. 6G illustrates a planar inverted-F antenna 695 and an exciter 697 according to one embodiment. The planar inverted-F antenna 695 includes a plate 696 (also referred to as a patch) that is shorted at one end to a ground plate 699 via shorting pin 698. The exciter 697 is disposed closer to the shorting pin end, and is feed at the feed line connector 530. The exciter 697 has a triangular shape that is substantially symmetrical relative to the plate 696. In other embodiments, other shapes may be used for the exciter 697. The exciter 697, when driven, excites the planar inverted-F antenna 695 to virtually expand the current surface, increasing the bandwidth of the planar inverted-F antenna 695. In other embodiments, the exciter 697 may be used in other microstrip antenna designs as would be appreciated by one of ordinary skill in the art having the benefit of this disclosure.

Figure 6H:
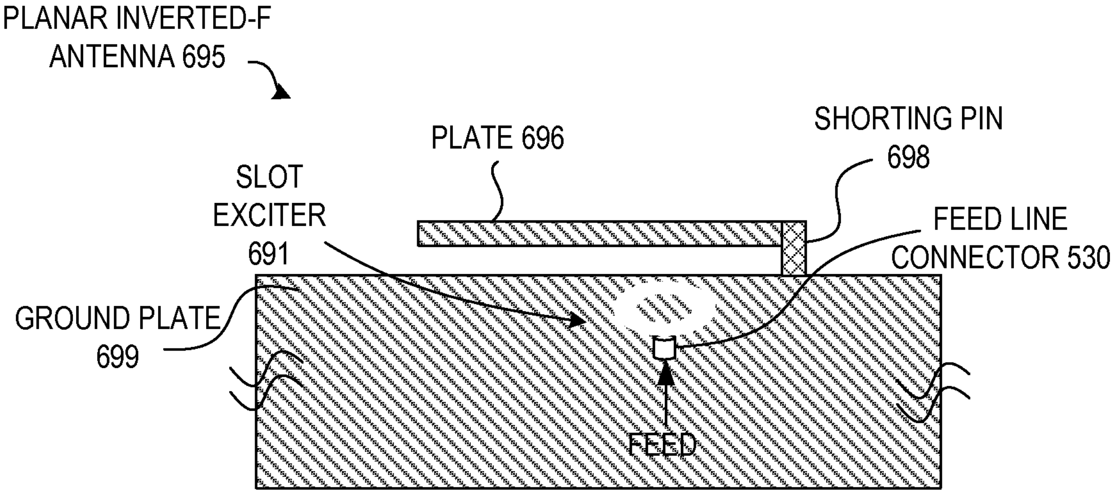
FIG. 6H illustrates a planar inverted-F antenna and a slot exciter according to another embodiment.

FIG. 6H illustrates a planar inverted-F antenna 695 and a slot exciter 691 according to another embodiment. The planar inverted-F antenna 695 includes a plate 696 (also referred to as a patch) that is shorted at one end to a ground plate 699 via shorting pin 698. The slot exciter 691 is disposed closer to the shorting pin end and in the ground plate 699, and is feed at the feed line connector 530. The slot exciter 691 has a oval shape. In other embodiments, other shapes may be used for the slot exciter 691. The slot exciter 691, when driven, excites the planar inverted-F antenna 695 to virtually expand the current surface, increasing the bandwidth of the planar inverted-F antenna 695. In other embodiments, the slot exciter 691 may be used in other microstrip antenna designs as would be appreciated by one of ordinary skill in the art having the benefit of this disclosure.

It should be noted that each of the exciters of FIGS. 6A-6D are physically coupled to one or more feed line connectors 530. In one embodiment, these feed line connectors 530 are physically coupled to a waveguide, such as the waveguide 740 illustrated in FIG. 7A. In another embodiment, these feed line connectors 530 are physically coupled to a RF cable, such as the RF cable 790 illustrated in FIG. 7B. Alternatively, these feed line connectors 530 can be driven using other methods, such as by conductive traces of a printed circuit board, as would be appreciated by one of ordinary skill in the art having the benefit of this disclosure.

Figure 8:
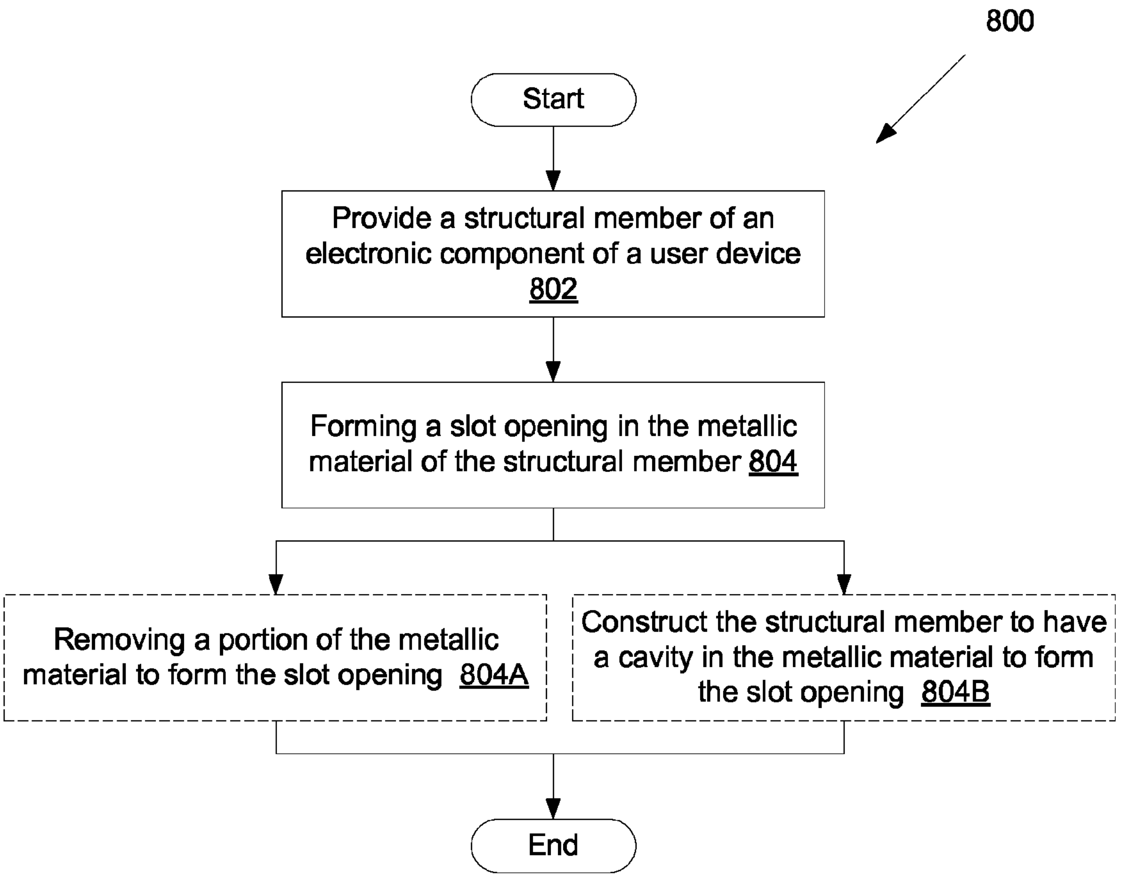
FIG. 8 is a flow diagram of an embodiment of a method of manufacturing a user device having a slot opening formed in metallic material of a structural member associated with an electronic component of the user device according to one embodiment.

FIG. 8 is a flow diagram of an embodiment of a method 800 of manufacturing a user device having a slot opening formed in metallic material of a structural member associated with an electronic component of the user device according to one embodiment. In method 800, a structural member of an existing electronic component of a user device is provided at block 802. The structural member is constructed of a material having metal and/or a metal alloy. The structural member may be a metallic support member of a display of the user device or of a touchpad or touchscreen of the user device, a metallic housing, a metallic portion of a non-metallic housing, a metallic bezel, a metallic support member of a circuit board, such as a printed circuit board (PCB), or metallic support members of other existing components, such as keyboards, buttons, displays, circuits, or the like. Alternatively, the metallic plate can be any conductive material in which slot openings can be formed, such as by removing portions of the metallic plate, or constructing the metallic plate to have cavities in the metallic material. For example, the metallic plate may be part of a printed circuit board, and the multi-band slot antenna and exciter can be formed using conductive traces on the printed circuit board. Alternatively, the conductive material may be flexible material disposed on a rigid substrate (e.g., PCB) or on a flexible substrate (e.g., a polyimide film, polyester film, or polyether ether ketone (PEEK) film) within the user device 205 to form the multi-band slot antenna and the non-radiating exciter. The conductive material may be fabricated as one integrated piece or as separate pieces.

Next, a slot opening of a slot antenna is formed in the metallic material of the structural member at block 804. This may be done by removing a portion of the metallic material to form the slot openings at block 804A or by constructing the structural member to have a cavity in the metallic material to form the slot opening at block 804B. The cavity may be an absence of the metallic material, leaving an air gap, or the cavity may be filled with a dielectric material, forming a material gap.

In another embodiment, a first portion of the metallic material is removed to form the slot opening of the slot antenna at block 804A, and a second portion of the metallic material is removed to form a second slot opening of a slot exciter that is operatively coupled to feed the slot antenna. In another embodiment, the structural member can be constructed to have a first cavity in the metallic material to form the slot opening at block 804B, and a second cavity in the metallic material to form a slot opening of a slot exciter. In another embodiment, the structural member can be constructed to have a single cavity in the metallic material to form a single slot opening for the slot antenna and the exciter. In these embodiments, the slot openings of the slot antenna and the slot exciter may be physically separated in the metallic material, or may form a single slot opening the metallic material. In another embodiment, more than one slot opening can be formed in the metallic material for the slot antenna.

In one embodiment where the structural member is a metallic housing of the user device, the slot openings of the slot antenna and the exciter are formed in the metallic housing. In another embodiment where the structural member is a non-metallic housing, the housing can be constructed of non-metallic material, and one or more cavities can be formed in the non-metallic material. The cavities are filled with the metallic material, and the slot openings of the slot antenna and/or the exciter can be formed in the metallic material, such as by removing portions of the metallic material that forms the slot openings or constructing the metallic material to have a cavity that forms the slot openings.

In another embodiment, the slot antenna is coupled to a feed line connector (e.g., feed line connector 302), and the slot antenna is driven by a feed through the feed line connector. The feed line connecter can be physically coupled to a waveguide, a RF cable, or the like. In another embodiment, the slot antenna is operatively coupled to an exciter, which is configured to be driven by a feed via the feed line connector, such as described with respect to FIGS. 10A and 10B.

Figure 9:
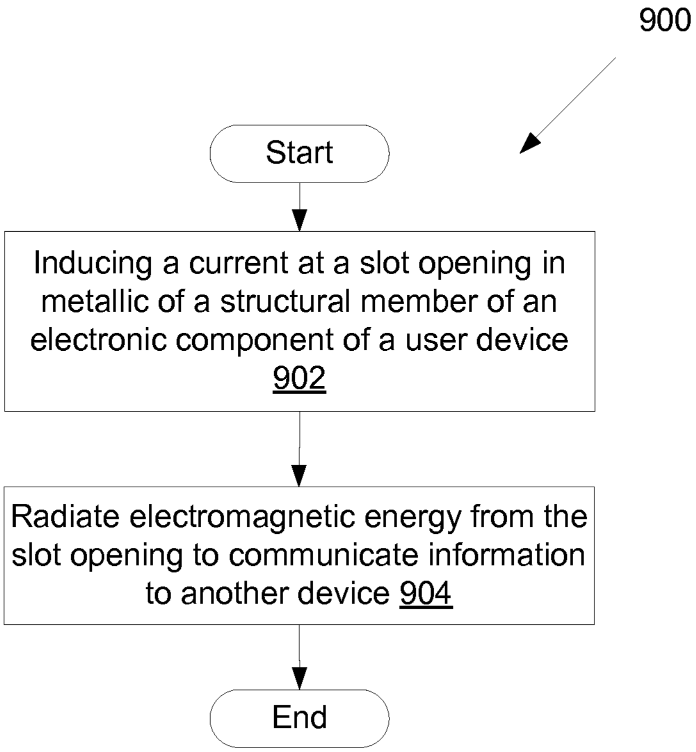
FIG. 9 is a flow diagram of an embodiment of a method of operating a user device having a slot opening formed in metallic material of a structural member associated with an electronic component of the user device according to one embodiment.

FIG. 9 is a flow diagram of an embodiment of a method 900 of operating a user device having a slot opening formed in metallic material of a structural member associated with an electronic component of the user device according to one embodiment. In method 900, current is induced at the slot opening in the metallic material of the structural member at block 902. In response to the induced current, electromagnetic energy is radiated from the slot opening to communicate information to another device at block 904. The electromagnetic energy forms a substantially omnidirectional radiation pattern. Alternatively, other mechanisms may be used to form directional radiation patterns.

In one embodiment, a current is induced at the slot opening, which induces a surface current flow around the slot opening. In another embodiment, a current is induced at an exciter that is operatively coupled to the slot opening. The exciter excites the slot antenna's surface current flow at the slot opening. By inducing the current at the exciter, the exciter increases the bandwidth of the multi-band aperture antenna. The exciter may be physically coupled to the slot opening or may be physically separated from the slot opening.

Figure 10:
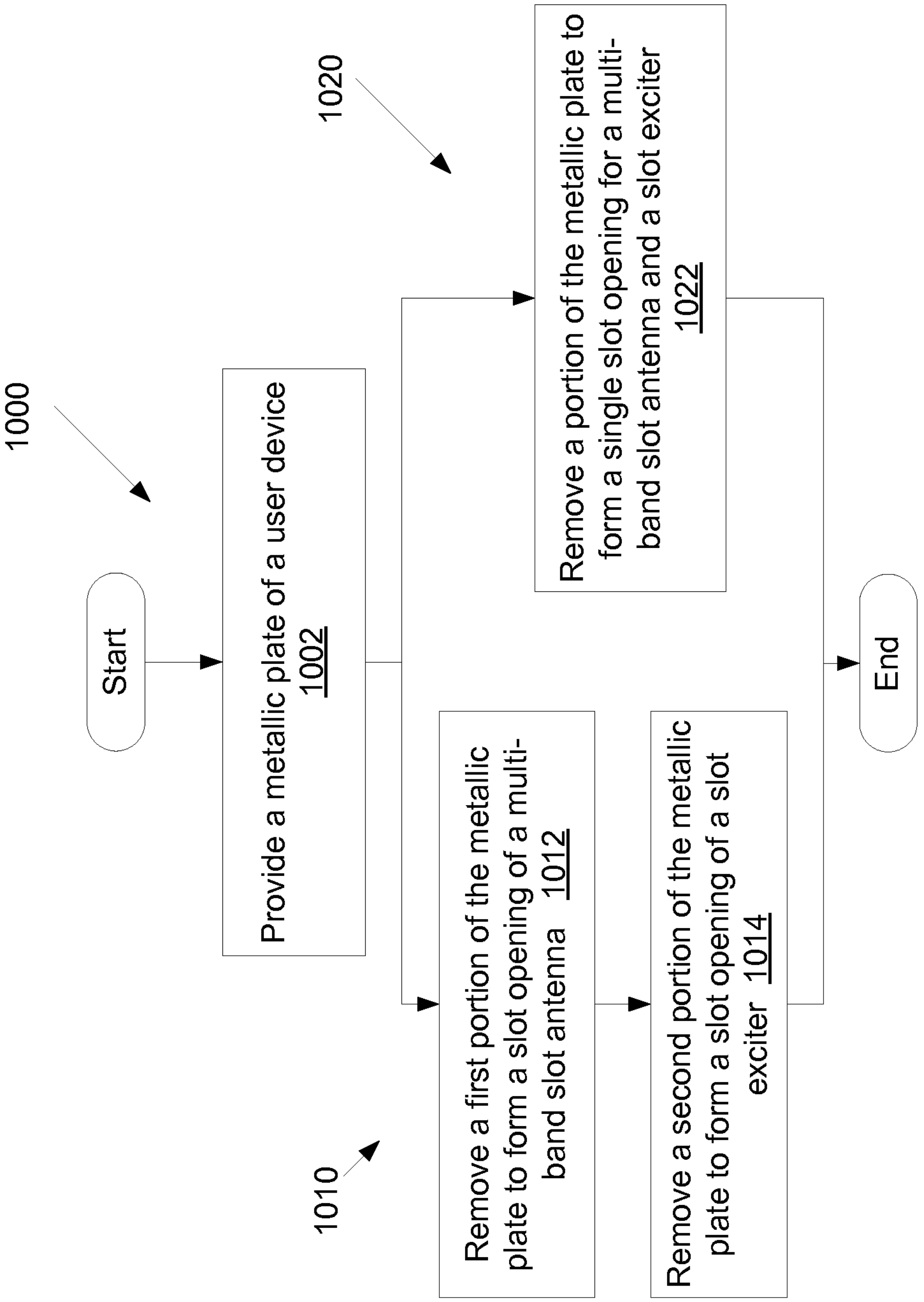
FIG. 10 is a flow diagram of an embodiment of a method of manufacturing a user device having a multi-band aperture antenna and an exciter according to one embodiment.

FIG. 10 is a flow diagram of an embodiment of a method 1000 of manufacturing a user device having a multi-band aperture antenna and an exciter according to one embodiment. In method 1000, a metallic plate of a user device is provided at block 1002. The metallic plate may be, or part of, a structural member that is constructed of a material having metal and/or a metal alloy. The metallic plate may also be a non-structural plate. Next, a multi-band aperture antenna and an exciter are formed in the metallic plate. This may be done by removing two portions of the metallic plate in process 1010 or by removing one portion of the metallic portion in process 1020.

In the embodiment of process 1010, a first portion of the metallic plate is removed that forms a slot opening of the multi-band aperture antenna at block 1012, and a second portion of the metallic plate is removed to form a slot opening of the slot exciter at block 1014. In the embodiment of process 1020, a portion of the metallic plate is removed to form a single slot opening for the multi-band aperture antenna and the slot exciter at block 1022.

In another embodiment of process 1010, instead of removing a first portion from the metallic plate, the metallic plate can be constructed to have a first cavity in the metallic material that forms the slot opening of the multi-band aperture antenna and a second cavity in the metallic material that forms the slot opening of the slot exciter. In another embodiment of process 1020, the metallic plate can be constructed to have a cavity in the metallic material that forms a single slot opening for the multi-band aperture antenna and the slot exciter.

In another embodiment of process 1010, a third portion can be removed from the metallic plate, the first and third portions forming two separate slot openings of the multi-band aperture antenna. Alternatively, the multi-band aperture antenna may be formed to have more than two slot openings. In another embodiment, the multi-band aperture antenna is formed of the two slot openings, and a wire exciter is physically coupled to the two slot openings of the multi-band aperture antenna. The two slot openings may be disposed on a first axis with a gap between the two slot openings, and the exciter is disposed on a second axis substantially equidistant to the two slot openings with the gaps having the same distance between the exciter and the respective slot openings.

In another embodiment, the exciter (e.g., slot exciter, wire exciter, etc) is physically coupled to a feed line connector (e.g., 530), and the feed line connector is physically coupled to a waveguide, a conductive trace, or a RF cable.

In one embodiment, the slot opening of the slot exciter is physically separated from the slot opening of the multi-band aperture antenna. In another embodiment, the slot opening is physically connected to the slot opening of the multi-band aperture antenna.

In another embodiment, the metallic material can be disposed on a non-metallic material, such as a non-conductive carrier, and then portions of the metallic material can be removed to form the appropriate shapes of the multi-band aperture antenna and the exciter (subtractive technique). Alternatively, the metallic material can be disposed on the non-metallic material (additive technique) to form the appropriate shape of the multi-band aperture antenna and the exciter. It should be noted that the multi-band aperture antenna and the exciter can be physically coupled before, during, or after being disposed in the metallic material. For example, when the multi-band aperture antenna and the exciter are a single slot opening, they are physically coupled when disposing them in the metallic material. For another example, the slot opening of the multi-band aperture antenna can be formed first and the wire exciter can be physically coupled after the slot opening has been formed. As described herein, the exciter can be physically separated from the multi-band aperture antenna. It should be noted that the embodiments of FIG. 10 describe a multi-band aperture antenna, but in other embodiments, other antennas may be fabricated to have an exciter operatively coupled to the antenna as would be appreciated by one of ordinary skill in the art having the benefit of this disclosure.

Figure 11:
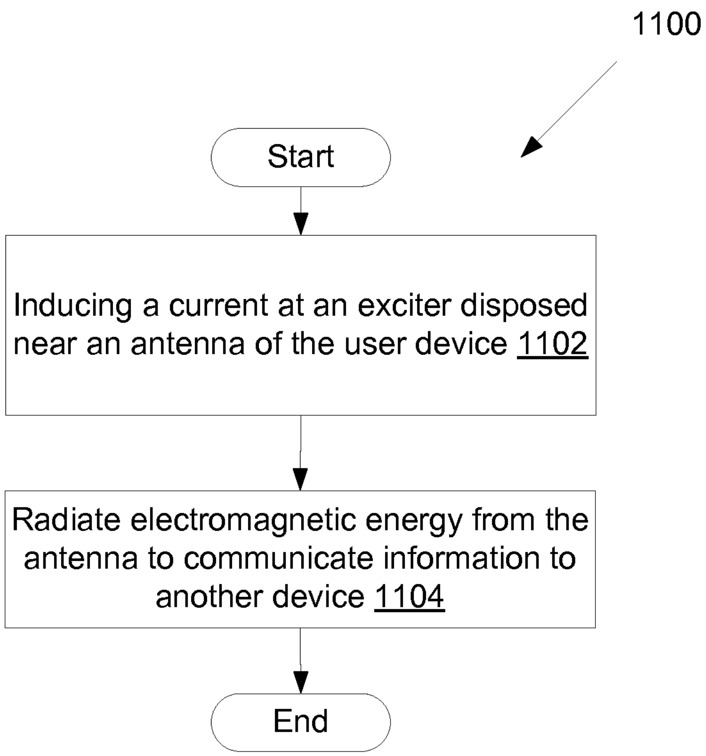
FIG. 11 is a flow diagram of an embodiment of a method of operating a user device having an antenna and an exciter according to one embodiment.

FIG. 11 is a flow diagram of an embodiment of a method 1100 of operating a user device having an antenna and an exciter according to one embodiment. In method 1100, current is induced at an exciter disposed near an antenna of the user device at block 1102. The exciter may be a slot exciter or a wire exciter, and may have a symmetrical shape as described herein. In response to the current induced at the exciter, electromagnetic energy is radiated from the antenna (e.g., from one or more slot openings of the multi-band aperture antenna) to communicate information to another device at block 1104. The electromagnetic energy forms a substantially omnidirectional radiation pattern. Alternatively, other mechanisms may be used to form directional radiation patterns.

In one embodiment, a current is induced at the exciter, which excites the current flow around the one or more slot openings. By inducing the current at the exciter, the exciter increases the bandwidth of the multi-band aperture antenna. The exciter may be physically coupled to the slot opening or may be physically separated from the slot opening. In one embodiment, the antenna is a multi-band aperture antenna. Alternatively, other types of antennas may be used as would be appreciated by one of ordinary skill in the art having the benefit of this disclosure.

Figure 12:
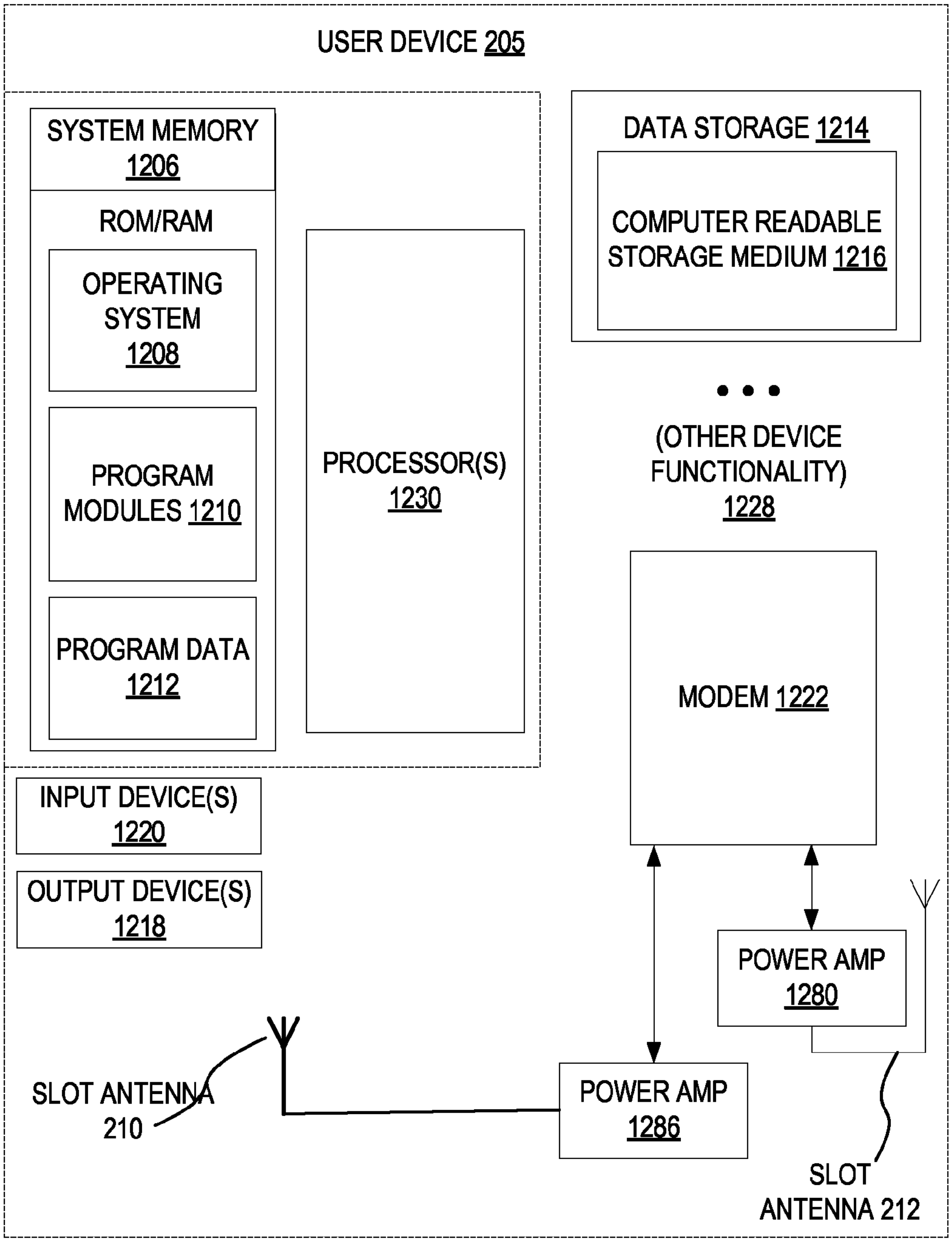
FIG. 12 is a block diagram of the user device having the two slot antennas of FIG. 2A according to one embodiment.

FIG. 12 is a block diagram of the user device 205 having the two slot antennas 210 and 212 of FIG. 2A according to one embodiment. The user device 205 includes one or more processors 1230, such as one or more CPUs, microcontrollers, field programmable gate arrays, or other types of processing devices. The user device 205 also includes system memory 1206, which may correspond to any combination of volatile and/or non-volatile storage mechanisms. The system memory 1206 stores information which provides an operating system component 1208, various program modules 1210, program data 1212, and/or other components. The user device 205 performs functions by using the processor(s) 1230 to execute instructions provided by the system memory 1206.

The user device 205 also includes a data storage device 1214 that may be composed of one or more types of removable storage and/or one or more types of non-removable storage. The data storage device 1214 includes a computer-readable storage medium 1216 on which is stored one or more sets of instructions embodying any one or more of the functions of the user device 205, as described herein. As shown, instructions may reside, completely or at least partially, within the computer readable storage medium 1216, system memory 1206 and/or within the processor(s) 1230 during execution thereof by the user device 205, the system memory 1206 and the processor(s) 1230 also constituting computer-readable media. The user device 205 may also include one or more input devices 1220 (keyboard, mouse device, specialized selection keys, etc.) and one or more output devices 1218 (displays, printers, audio output mechanisms, etc.).

The user device 205 further includes a wireless modem 1222 to allow the user device 205 to communicate via a wireless network (e.g., such as provided by a wireless communication system) with other computing devices, such as remote computers, an item providing system, and so forth. The wireless modem 1222 allows the user device 205 to handle both voice and non-voice communications (such as communications for text messages, multimedia messages, media downloads, web browsing, etc.) with a wireless communication system. The wireless modem 1222 may provide network connectivity using any type of digital mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc. In addition to wirelessly connecting to a wireless communication system, the user device 205 may also wirelessly connect with other user devices. For example, user device 205 may form a wireless ad hoc (peer-to-peer) network with another user device.

The wireless modem 1222 may generate signals and send these signals to power amplifier (amp) 1280 or power amp 1286 for amplification, after which they are wirelessly transmitted via the antenna 210 or antenna 212, respectively. The antenna 212 may be any directional, omnidirectional, or non-directional antenna in a different frequency band than the frequency bands of the slot antenna 210. The slot antenna 210 may also be any of the various multi-band aperture antennas described herein, such as those antennas described with respect to FIGS. 5A-7B. The antenna 212 may also transmit information using different wireless communication protocols than the slot antenna 210. In addition to sending data, the slot antenna 210 and the antenna 212 also receive data, which is sent to wireless modem 1222 and transferred to processor (s) 1230. It should be noted that, in other embodiments, the user device 205 may include more or less components as illustrated in the block diagram of FIG. 12.

In one embodiment, the user device 205 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WiFi hotspot and a connection to a wireless carrier system. In one embodiment, the first wireless connection is associated with the slot antenna 210 and the second wireless connection is associated with the antenna 212. In another embodiment, the first wireless connection is associated with a first frequency band and the second connection with a second frequency band of a multi-band aperture antenna that operates at multiple frequencies as described herein. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a single modem 1222 is shown to control transmission to both antennas 210 and 212, the user device 205 may alternatively include multiple wireless modems, each of which is configured to transmit/receive data via a different antenna and/or wireless transmission protocol. In addition, the user device 205, while illustrated with two antennas 210 and 212, may include more or fewer antennas in various embodiments.

The user device 205 delivers and/or receives items, upgrades, and/or other information via the network. For example, the user device 205 may download or receive items from an item providing system. The item providing system receives various requests, instructions, and other data from the user device 205 via the network. The item providing system may include one or more machines (e.g., one or more server computer systems, routers, gateways, etc.) that have processing and storage capabilities to provide the above functionality. Communication between the item providing system and the user device 205 may be enabled via any communication infrastructure. One example of such an infrastructure includes a combination of a wide area network (WAN) and wireless infrastructure, which allows a user to use the user device 205 to purchase items and consume items without being tethered to the item providing system via hardwired links. The wireless infrastructure may be provided by one or multiple wireless communications systems, such as one or more wireless communications systems. One of the wireless communication systems may be a wireless fidelity (WiFi) hotspot connected with the network. Another of the wireless communication systems may be a wireless carrier system that can be implemented using various data processing equipment, communication towers, etc. Alternatively, or in addition, the wireless carrier system may rely on satellite technology to exchange information with the user device 205.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A user device, comprising:

a structural member associated with an electronic component of the user device, wherein the structural member is constructed from a material comprising metal;

a slot antenna disposed in the material of the structural member, wherein the slot antenna is a multi-band slot antenna comprising a first opening disposed substantially along a longitudinal axis of the multi-band slot antenna and a second opening disposed substantially along the longitudinal axis of the multi-band slot antenna;

an exciter operatively coupled to feed the multi-band slot antenna, wherein the exciter comprises a third opening coupled to the first opening and the second opening to form a single slot opening in the structural member, wherein the exciter has a non-linear shape, wherein the exciter is centered about an axis that is substantially perpendicular to the longitudinal axis of the multi-band slot antenna, wherein the exciter is co-planar with the slot antenna and comprises a first portion of the third opening configured to feed the first opening and a second portion of the third opening configured to feed the second opening; and a feed line connector coupled to the exciter, wherein the feed line connector is to be coupled to a transmission line comprising at least one of a radio frequency (RF) cable, a waveguide, a wire, or a conductive trace.

2. The user device of claim 1, wherein the single slot opening has a substantially symmetric shape.

3. The user device of claim 1, wherein the electronic component is a display and the structural member is a metallic support member that supports the display.

4. The user device of claim 1, wherein the electronic component is a circuit board, and wherein the structural member is at least one of a metallic support member that supports the circuit board, a metal ground plane of the circuit board, or a metal back panel of an assembly that supports the circuit board.

5. The user device of claim 1, wherein the electronic component is a user input device, and wherein the structural member is at least one of a metallic support member that supports the user input device, a metal ground plane of the user input device, or a metal back panel of an assembly that supports the user input device.

6. The user device of claim 1, wherein the structural member is a metallic housing of the user device.

7. The user device of claim 1, wherein the structural member is a housing of the user device, and wherein a first portion of the housing is constructed of a second non-metallic material and a second portion of the housing is constructed of the material, and wherein the slot antenna is formed in the second portion of the housing.

8. The user device of claim 1, wherein the structure member is a metallic bezel of the user device.

9. The user device of claim 1, wherein the material comprises metal alloy.

10. The user device of claim 1, further comprising:

a wireless modem; and a power amplifier coupled to the wireless modem and the slot antenna.

11. The user device of claim 1, wherein the first slot opening and the second slot opening are rectangular slot openings.

12. The user device of claim 1, wherein the non-linear shape is at least one of a circular shape, an oval shape, a C shape, a U shape, an inverted-U shape, an inverted-C shape, a loop shape, an arc shape, ring shape, a W shape, a M shape, or a horseshoe shape.

13. A method of manufacturing a user device, the method comprising:

providing a structural member of the user device, wherein the structural member is constructed of a metallic material;

forming a first slot opening of a slot antenna in the metallic material of the structural member, wherein the slot antenna is a multi-band slot antenna;

forming a second slot opening of the slot antenna in the metallic material;

forming a third opening of an exciter in the metallic material, wherein the exciter and the exciter is operatively coupled to feed the multi-band slot antenna, wherein the first opening, second opening, and third opening form a single slot opening in the metallic material, wherein the exciter has a non-linear shape, wherein the third opening is formed to be centered about an axis that is substantially perpendicular to a longitudinal axis of the slot antenna, wherein the exciter is co-planar with the slot antenna and comprises a first portion of the third opening configured to feed the first slot opening and a second portion of the third opening configured to feed the second slot opening, wherein the exciter is to be coupled to a feed line connector to be connected to a transmission line comprising at least one of a radio frequency (RF) cable, a waveguide, a wire, or a conductive trace.

14. The method of claim 13, wherein said forming the first slot opening comprises removing a first portion of the metallic material to form the first slot opening, wherein said forming the second slot opening comprises removing a second portion of the metallic material to form the second slot opening, and wherein said forming the third opening comprises removing a third portion of the metallic material to form the exciter.

15. The method of claim 13, wherein said forming the first slot opening comprises constructing the structural member to have a first cavity in the metallic material to form the first slot opening, wherein said forming the second slot opening comprises constructing the structural member to have a second cavity in the metallic material to form the second slot opening, and wherein said forming the third opening comprises removing a third cavity in the metallic material to form the exciter.

16. The method of claim 13, wherein said forming the first slot opening comprises constructing the structural member to have a first cavity in the metallic material to form the first slot opening, wherein said forming the second slot opening comprises constructing the structural member to have a second cavity in the metallic material to form the second slot opening, and wherein said forming the third opening comprises constructing the structural member to have a third cavity in the metallic material to form the exciter.

17. The method of claim 13, wherein said forming the first slot opening, second slot opening and third opening comprises constructing the structural member to have a single cavity in the metallic material to form the single slot opening in the metallic material comprising the multi-band slot antenna and the exciter.

18. The method of claim 13, wherein the structural member is a housing of the user device, and wherein said forming the first slot opening or the second slot opening comprises:

constructing the housing with a second non-metallic material;

forming a cavity in the non-metallic material of the housing; and filling the cavity with the metallic material to form the respective one of the first slot opening or the second slot opening.

19. The method of claim 13, wherein the first opening and the second opening form at least one of a rectangular shape, a circular shape, an oval shape, a C shape, a U shape, an inverted-U shape, an inverted-C shape, a loop shape, an arc shape, ring shape, a W shape, a M shape, or a horseshoe shape.

20. The method of claim 13, wherein the non-linear shape is at least one of a circular shape, an oval shape, a C shape, a U shape, an inverted-U shape, an inverted-C shape, a loop shape, an arc shape, ring shape, a W shape, a M shape, or a horseshoe shape.

21. A method of operating a user device, comprising:

applying a current at an exciter operatively coupled to a slot antenna formed in metallic material of a structural member associated with an electronic component of the user device, wherein the slot antenna is a multi-band slot antenna comprising a first opening and a second opening, wherein the exciter comprises a third opening comprising a non-linear shape and is centered about an axis that is substantially perpendicular to a longitudinal axis of the multi-band slot antenna, wherein the exciter is co-planar with the slot antenna and comprises a first portion of the third opening configured to feed the first opening and a second portion of the third opening configured to feed the second opening, wherein the first opening, second opening and third opening form a single slot opening in the metallic material;

exciting surface current flow at the slot antenna using the exciter, wherein the exciter is coupled to a feed line connector, wherein the feed line connector is coupled to a transmission line; and radiating electromagnetic energy from the slot antenna due to the current to communicate information to another device.

22. The method of claim 21, wherein the first opening and the second opening form at least one of a rectangular shape, a circular shape, an oval shape, a C shape, a U shape, an inverted-U shape, an inverted-C shape, a loop shape, an arc shape, ring shape, a W shape, a M shape, or a horseshoe shape.

23. The method of claim 21, wherein the non-linear shape is at least one of a circular shape, an oval shape, a C shape, a U shape, an inverted-U shape, an inverted-C shape, a loop shape, an arc shape, ring shape, a W shape, a M shape, or a horseshoe shape.

* * * * *